US012339777B2

(12) United States Patent
Robinson

(10) Patent No.: US 12,339,777 B2
(45) Date of Patent: Jun. 24, 2025

(54) DYNAMIC EXTENSION AND DE-ALLOCATION OF CACHE COHERENCE SNOOP FILTER ENTRY

(71) Applicant: Microsoft Technology Licensing, LLC, Redmond, WA (US)

(72) Inventor: Eric Francis Robinson, Raleigh, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/340,359

(22) Filed: Jun. 23, 2023

(65) Prior Publication Data

US 2024/0427703 A1    Dec. 26, 2024

(51) Int. Cl.
*G06F 12/0831* (2016.01)
*G06F 12/0891* (2016.01)

(52) U.S. Cl.
CPC ...... *G06F 12/0831* (2013.01); *G06F 12/0891* (2013.01)

(58) Field of Classification Search
None
See application file for complete search history.

(56) References Cited

U.S. PATENT DOCUMENTS

| 6,631,447 | B1 | 10/2003 | Morioka |
| 9,223,711 | B2 | 12/2015 | Philip |
| 10,592,424 | B2 | 3/2020 | Beard |
| 10,657,055 | B1 | 5/2020 | Jalal |
| 11,550,720 | B2 | 1/2023 | Ramagiri |
| 2002/0124144 | A1 | 9/2002 | Gharachorloo |
| 2008/0147988 | A1* | 6/2008 | Heller ................ G06F 12/0831 |
| | | | 711/E12.001 |
| 2008/0209133 | A1 | 8/2008 | Ozer |
| 2014/0052905 | A1 | 2/2014 | Lih |
| 2015/0012719 | A1 | 1/2015 | Tune |
| 2016/0062890 | A1 | 3/2016 | Salisbury |
| 2016/0062893 | A1 | 3/2016 | Tune |
| 2016/0117249 | A1 | 4/2016 | Lin |
| 2017/0255557 | A1 | 9/2017 | Robinson |
| 2017/0286299 | A1 | 10/2017 | Sury |
| 2019/0073304 | A1 | 3/2019 | Jiang |
| 2020/0042446 | A1 | 2/2020 | Mittal |
| 2020/0218657 | A1 | 7/2020 | Forrest |
| 2020/0250098 | A1 | 8/2020 | Ma |
| 2021/0294743 | A1 | 9/2021 | Randall |

(Continued)

FOREIGN PATENT DOCUMENTS

WO    2017155659 A1    9/2017

OTHER PUBLICATIONS

A. Moshovos, "RegionScout: Exploiting Coarse Grain Sharing in Snoop-Based Coherence", 32nd International Symposium on Computer Architecture (ISCA'05)—IEEE, Jun. 4, 2005, pp. 234-245.

(Continued)

*Primary Examiner* — Charles J Choi
(74) *Attorney, Agent, or Firm* — Holzer Patel Drennan

(57) ABSTRACT

The described technology provides a method including selecting a physical SFT entry to be victimized, the physical SFT entry being one of a base SFT entry and an extra SFT entry of a logical SFT entry in a snoop filter (SFT) and consolidating the base SFT entry and the extra SFT entry into one physical entry.

20 Claims, 18 Drawing Sheets

(56) References Cited

U.S. PATENT DOCUMENTS

| | | |
|---|---|---|
| 2022/0100672 A1 | 3/2022 | Apte |
| 2022/0164288 A1 | 5/2022 | Ramagiri |
| 2022/0308999 A1 | 9/2022 | Randall |
| 2023/0100746 A1 | 3/2023 | Loison |
| 2023/0139212 A1 | 5/2023 | Randall |
| 2024/0403218 A1 | 12/2024 | Robinson |
| 2024/0403219 A1 | 12/2024 | Kaseridis et al. |
| 2024/0419593 A1 | 12/2024 | Ramakrishna |
| 2024/0419594 A1 | 12/2024 | Panavich |

OTHER PUBLICATIONS

Ehsan Atoofian, "Adaptive Snoop Granularity and Transactional Snoop Filtering in Hardware Transactional Memory", Canadian Journal of Electrical and Computer Engineering-IEEE, vol. 37, Issue 2, 2014, pp. 76-85.

International Search Report and Written Opinion received for PCT Application No. PCT/US2024/029558, Aug. 30, 2024, 15 pages.

International Search Report and Written Opinion received for PCT Application No. PCT/US2024/030161, Jul. 24, 2024, 12 pages.

Moshovos, et al., "Jetty: filtering snoops for reduced energy consumption in SMP servers", Proceedings HPCA Seventh International Symposium on High-Performance Computer Architecture—IEEE, Jan. 19, 2001, pp. 85-96.

Non-Final Office Action mailed on Jul. 8, 2024, in U.S. Appl. No. 18/326,147, 12 pages.

Non-Final Office Action mailed on Jun. 10, 2024, in U.S. Appl. No. 18/325,863, 13 pages.

Zebchuk, et al., "Multi-grain coherence directories", Micro-46: Proceedings of the 46th Annual IEEE/ACM International Symposium on Microarchitecture, Dec. 7, 2013, pp. 359-370.

International Search Report and Written Opinion received for PCT Application No. PCT/US2024/033323, Oct. 11, 2024, 11 pages.

International Search Report and Written Opinion received for PCT Application No. PCT/US2024/033480, Sep. 10, 2024, 15 pages.

International Search Report and Written Opinion received for PCT Application No. PCT/US2024/034880, Oct. 14, 2024, 14 pages.

Non Final Office Action mailed on Sep. 26, 2024, in U.S. Appl. No. 18/336,637, 09 pages.

Notice of Allowance mailed on Oct. 23, 2024, in U.S. Appl. No. 18/326,147, 9 pages.

Final Office Action mailed on Dec. 11, 2024, is U.S. Appl. No. 18/325,863, 13 pages.

Notice of Allowance mailed on Feb. 14, 2025, in U.S. Appl. No. 18/336,637 10 pages.

Non-Final Office Action mailed on Feb 13, 2025, in U.S. Appl. No. 18/336,694, 27 pages.

Notice of Allowance mailed on Feb. 10, 2025, in U.S. Appl. No. 18/326,147, 05 pages.

Notice of Allowance mailed on Apr. 28, 2025, in U.S. Appl. No. 18/325,863, 8 pages.

\* cited by examiner

DYNAMIC EXTENSION AND DE-ALLOCATION OF CACHE COHERENCE SNOOP FILTER ENTRY

BACKGROUND

A processor-based device may include multiple processing elements (PEs) (e.g., processor cores, as a non-limiting example) that each provide one or more local caches for storing frequently accessed data. Because the multiple PEs of the processor-based device may share a memory resource such as a system memory, multiple copies of shared data read from a given memory address may exist at the same time within the system memory and within the local caches of the PEs. Thus, to ensure that all of the PEs have a consistent view of the shared data, the processor-based device provides support for a cache coherence protocol to enable local changes to the shared data within one PE to be propagated to other PEs.

SUMMARY

The described technology provides a method including selecting a physical SFT entry to be victimized, the physical SFT entry being one of a base SFT entry and an extra SFT entry of a logical SFT entry in a snoop filter (SFT) and consolidating the base SFT entry and the extra SFT entry into one physical entry.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
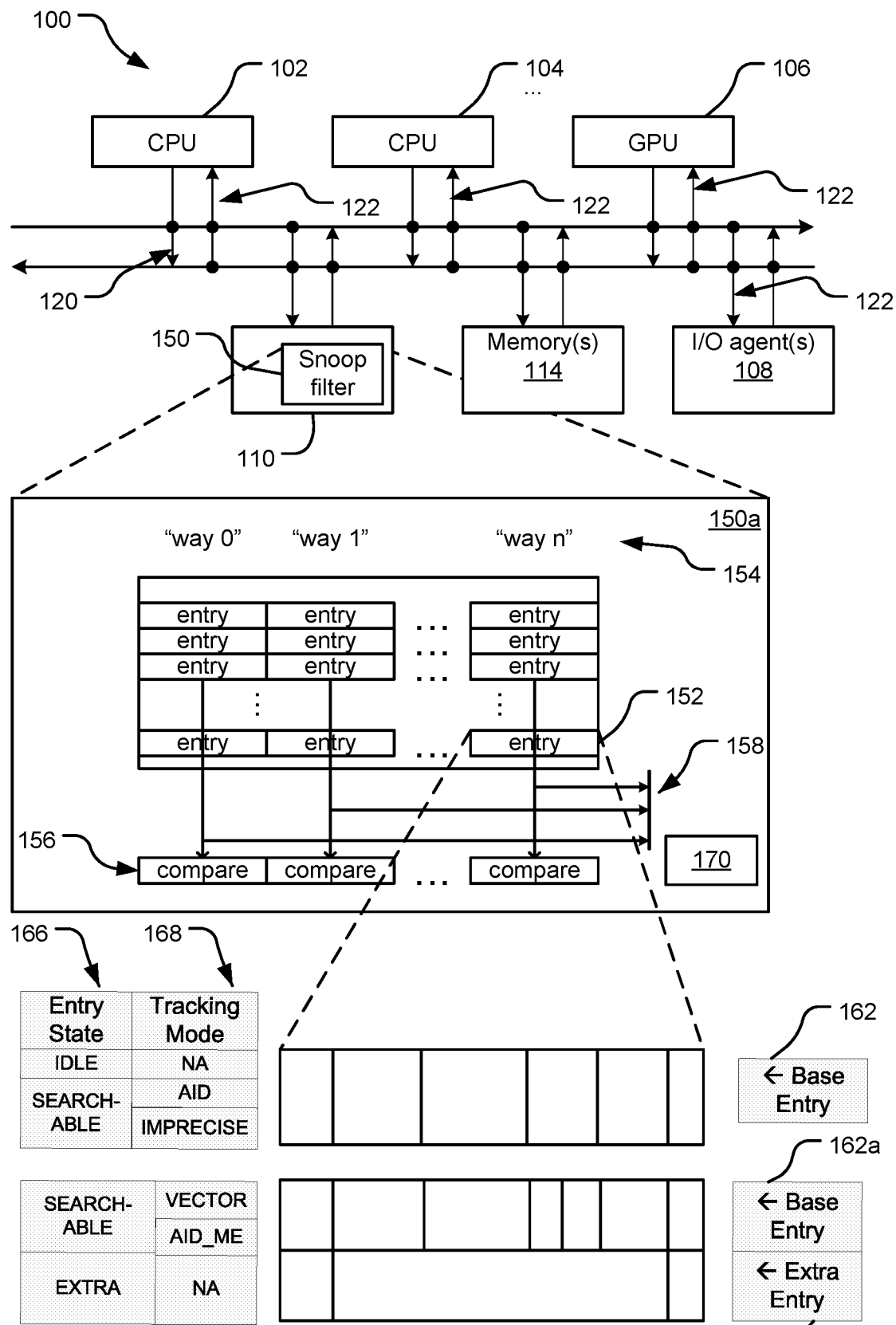
FIG. 1 illustrates an implementation of a system providing cache coherence using snoop filters.

Implementations disclosed herein disclose multi-processor systems that employ hardware (HW)-enforced cache coherency in which when an agent, such as a CPU, a GPU, etc., wants to access a memory location, HW automatically determines whether another agent currently holds a copy of that memory location. If the access is a read and the memory location is cached by another agent, system memory might be stale, in which case the access must be satisfied by obtaining the data from the other agent's cache. If the access is a write, typically other cached copies must be first written back to system memory. The memory block for which HW-enforced cache coherency is maintained is called a coherence granule (cogran) and system may match its cogran size to the cache line size.

In some implementations, the system may maintain a list of which cograns are currently cached by which agents. In other implementations, there may be no central coherence directory that needs to be maintained, and instead, during the course of handling the requested memory access, all agents are queried to determine whether any holds a copy of the cogran in their cache. This query is commonly referred to as a snoop. An over-snoop condition occurs when an agent is snooped to search for a cogran in its cache and that agent does not currently hold a copy of that cogran. The snoop is functionally useless and unnecessarily perturbs that agent. A system disclosed herein discloses advantageous implementations using a snoop filter (SFT) to help reduce over-snooping. Such implementations reduce over-snooping penalties in terms of latency added to the memory access, interconnect bandwidth consumed for no functional benefit, and energy wasted to perform unnecessary cache lookup(s) at the agents that are over-snooped. A snoop filter may be thought of as a higher-level, inclusive, set-associative cache that has no data and whose purpose is to track the entire set of cograns held by the lower-level cache(s) for which cache coherence needs to be maintained.

An imprecise snoop filter is a filter that tracks that a cogran has been cached by some agent at some point. This SFT is smaller than other types but the lack of precision means that when a snoop needs to be sent, all coherent caches in the system need to be snooped. The lack of precision also means that the SFT generally loses the ability to detect when the cogran has been evicted from all the coherent caches.

A precise snoop filter may employ a vector to track exactly which agents have cached a copy of a cogran. A precise SFT requires a relatively large amount of area to implement because it tracks a lot of state, 1 bit per agent per cogran tracked. In this implementation, when an agent obtains a copy of a cogran to write into its cache, the agent's corresponding vector bit in the SFT entry tracking that cogran is set. When the agent later evicts the cogran, its corresponding vector bit in the SFT entry tracking that cogran is cleared. This has a couple of advantages over the imprecise SFT: (a) only the exact agents that need to be snooped will be snooped; (b) the snoop scope can be further reduced over time as individual agents evict the cogran from their caches and the SFT is updated accordingly, this applies only to evictions that the agents communicate to the SFT.

In a hybrid implementation an SFT may track precisely up to (n) agents (typically, 2-3) by recording their agent ID (AID) in the SFT's cogran tracking information. The AID may be a unique identifier for each agent that the SFT tracks. For example, the AID could be an encode of the SFT vector position that agent may otherwise set. Alternatively, the AID may be the agent's interconnect address—the ID used by the interconnect to send messages to that agent. When >(n) agents have cached a copy of the cogran, the SFT switches from AID-tracking to imprecise-tracking. When the hybrid implementation is in an AID-tracking_mode, there are no over-snoops because the SFT entry knows exactly whom to snoop. On the other hand, when the hybrid implementation is in an imprecise tracking_mode, the SFT entry indicates that all agents need to be snooped if the cogran is currently held, or tracked, by the SFT. When the system has many coherent agents (e.g., 128), this approach employs less HW than the precise vector SFT—recording (n) AIDs (for a small enough n) require fewer state bits than a large vector.

In a system with many coherent agents (e.g., 128) the over-snooping due to imprecise tracking is very costly in terms of fabric bandwidth consumed and energy wasted. Furthermore, the larger SFT needed for precise tracking is very costly in terms of area which also causes snoop (and other) message travel distances to grow. Workloads with many agents sharing data structures or sharing instruction pages may quickly exhaust the precise-AID tracking ability of the hybrid approach and may lead to the imprecise tracking_mode being used more often. While some amount of over-snooping may be tolerated because the various imprecise tracking modes generally don't have the ability to recover back to precise tracking as cograns are evicted, snoop filter management itself incurs an over-snooping overhead. Specifically, when the snoop filter is unable to know which cograns are no longer cached by any agents, the snoop filter may more frequently send "filter flush" snoops to make room in the SFT itself so that it may install a newly tracked cogran in the SFT. The purpose of a filter flush snoop for an SFT entry is to cause a victimized cogran to be evicted from all agents because the SFT may lose the ability to track that cogran when it completes the victimization of that SFT entry.

FIG. 1 discloses an implementation of a cache coherence system 100 using snoop filters that improves upon one or more of the above implementations. Specifically, the cache coherence system 100 may be implemented on a multi-core architecture that includes a number of central processing unit (CPU) cores, 102 and 104, a graphical processing unit (GPU) 106, one or more input/output (I/O) agents 108, a point of serialization (PoS) 110, and a memory 114. Although the present example shows two CPU cores and one GPU, it is understood that any number of CPU cores and CPUs can be used without deviating from the scope of the present disclosure. Examples of the I/O agents 108 include, but are not limited to, Industry Standard Architecture (ISA) devices, Peripheral Component Interconnect (PCI) devices, PCI-X devices, PCI Express devices, Universal Serial Bus (USB) devices, Advanced Technology Attachment (ATA) devices, Small Computer System Interface (SCSI) devices, and InfiniBand devices.

The processing unit cores 102, 104, 106, and the I/O agents 108 may be referred to as agents 102-108, each referenced by agent IDs (AIDs). These agents 102-108 may have multiple levels of internal caches such as L1, L2, and L3 caches. As the agents 102-108 cache coherent memory blocks (cograns) in their internal caches, a snoop filter (SFT) 150 may keep track of those cograns and of which agents 102-108 have cached each one. Any of the agents 102-108 may issue coherent or non-coherent requests and the PoS 110 ensures the serialization of the memory access requests using the snoop filter 150 to provide memory coherency.

For example, the PoS 110 receives a coherent request 120 from a CPU 102. In response to the coherent request 120, the PoS 110 issues a snoop command 122 to the CPU cores 104, the GPU 106, and the I/O agents 108. The CPU cores 104, the GPU 106, and the I/O agents 108 may provide the requested coherent information back to the PoS 110. When sending the snoop 122, the PoS 110 refers to the SFT 150.

An example implementation of the SFT 150 is illustrated by SFT 150a. The SFT 150a includes a data structure to track the address and agent(s) 102-108 that have obtained a copy of every cogran that is currently cached by agents 102-108. The SFT 150a may have an n-way set-associative organization as indicated by n-arrays 154. The snoop filter 150a may include an array of entries 152, the content of the entries 152 is further described below. Each of the entries 152 may include a Tag field, such as the Tag field 218 disclosed in FIG. 2, that is used to store a tag portion of physical address (PA) that identifies a cogran. For example, for cogran size of 64 bytes, and SFT being a 16-way associative SFT, bits 15:6 of the PA may be used to select an SFT set and bits 47:16 of the PA may be stored as the tag in the Tag field 218 of the SFT entries 152. When the SFT 150a needs to perform a lookup to see if a cogran's PA is present in the SFT 150a, it selects one of the 16 sets using PA[15:6]. Subsequently, for the selected set, the SFT 150a may compare 156 the PA[47:16] against the tag values stored in the Tag field 218 of the 16 SFT entries 152 in the selected set. If the Tag field 218 of any of the 16 SFT entries in the selected set finds a match, then its way (e.g., way 5) is currently tracking the cogran being looked up.

In an implementation of the SFT 150a disclosed herein, a logical entry 152 may be configured to hold up to n agent IDs (AIDs) in a base SFT entry 162 and to dynamically allocate an extra SFT entry 164 in an SFT set for the cases where a cogran is shared by more than n agents. For example, in one implementation n may be three (3) such that the base SFT entry 162 is configured to hold 3 AIDs and in cases where a cogran is shared by more than 3 agents, the extra SFT entry 164 is dynamically allocated. Additionally, when the extra SFT entry 164 is dynamically allocated, the base SFT entry 162a may hold a portion of the SFT entry's tracking vector and the extra SFT entry 164 may hold another, remainder, portion of the SFT entry's tracking vector. Here a tracking vector includes a number of validity bits with the length of the tracking vector being the maximum number of agents 102-108 that might obtain the cogran corresponding to the Tag field of that SFT entry. There is thus a 1:1 correspondence between each agent instance and each bit of the tracking vector. In one implementation, the tracking vector may have 128 bits, thus tracking 128 agents 102-108 for the cogran corresponding to the Tag field of that SFT entry. Each validity bit may take a value of valid or invalid indicating a cache validity state of the cogran for an agent identified by the validity bit.

For example, the value of a validity bit being valid may indicate that the agent 102-108 that corresponds to that validity bit has cached the cogran corresponding to the Tag field of that SFT entry in its private cache, referred to as a valid cache validity state for that agent. On the other hand, a value of invalid for an invalidity bit indicates that the agent 102-108 that corresponds to that validity bit has not cached the cogran corresponding to the Tag field of that SFT entry in its private cache, referred to as an invalid cache validity state for that agent 102-108. The tracking vector and the validity bit values are further described below with respect to FIG. 4.

Specifically, the base SFT entry 162a holds the SFT entry's state information and the extra SFT entry 164 may give the base SFT entry 162a an additional storage needed to track additional agents, for example 128 agents, in a fine-grained manner for the times that a cogran is widely shared beyond the n AIDs in the base SFT entry 162a. In other words, a logical SFT entry in the SFT 150a may include either one base SFT entry 162 that may track up to n AIDs or combination of one base SFT entry 162a and an extra SFT entry 164 that is able to track every agent in the system that might coherently cache a cogran.

When the logical SFT entry includes only one base SFT entry 162, the entry_state field 166 of the SFT entry 162 may be either IDLE or SEARCHABLE and the Tracking_mode field 168 of the SFT entry 162 be one of NA (if entry_state=IDLE), AID or IMPRECISE. On the other hand, when the logical SFT entry includes a combination of one base SFT entry 162a and an extra SFT entry 164, the Entry_state field 166 of the base SFT entry 162a may be changed to SEARCHABLE and the Tracking_mode field 168 of the base SFT entry 162a may be changed to VECTOR or AID_ME. On the other hand, in this case, the Entry_state field 166 of the extra SFT entry 164 is set to EXTRA and the Tracking_mode field 168 of the extra SFT entry 164 is set to NA. when the Tracking_mode field 168 of the base SFT entry 162a is changed to VECTOR, the tracking_info field of the extra entry 162a may store portion of tracking vector. When the Tracking_mode field 168 of the base SFT entry 162a is changed to AID_ME, the tracking_info field of the base entry 162a and the tracking_info field of the extra entry 164 may store more AIDs.

In an implementation disclosed herein, the cache coherence system 100 enables the logical SFT entry 152 to de-allocate the extra SFT entry 164 when it is no longer needed to hold the tracking information. Specifically, the cache coherence system 100 enables the extra SFT entry 164 to be victimized without victimizing the logical SFT entry 152. Furthermore, the two physical SFT entries 162a and 164 that make the logical SFT entry 152 are consolidated into a single physical SFT entry. Specifically, the two physical SFT entries 162a and 164 are consolidated into the extra SFT entry 164 if an SFT victim selection logic 170 of the cache coherence system 100 determines to evict an SFT base entry such as the SFT base entry 162 that has an extra SFT entry associated therewith. The implementation of the cache coherence system 100 with the victim selection logic 170 in this manner enables the extra SFT entry 164 to hold more agent IDs (AIDs) rather than being limited to holding a precise vector. Furthermore, it also enables the logical SFT entry 152 to have more than one extra entries. The functioning of the victim selection logic 170 to achieve these objectives is disclosed below in further detail.

The detailed structure of the base SFT entries 162 and 162a, and the extra SFT entry 164 are illustrated in further detail below in FIG. 2. The implementation of the SFT entry 152 in the manner disclosed herein allows the cache coherence system 100 to take advantage of the fact that most cograns are not cached concurrently by more than a few of the agents 104-108.

Figure 2:
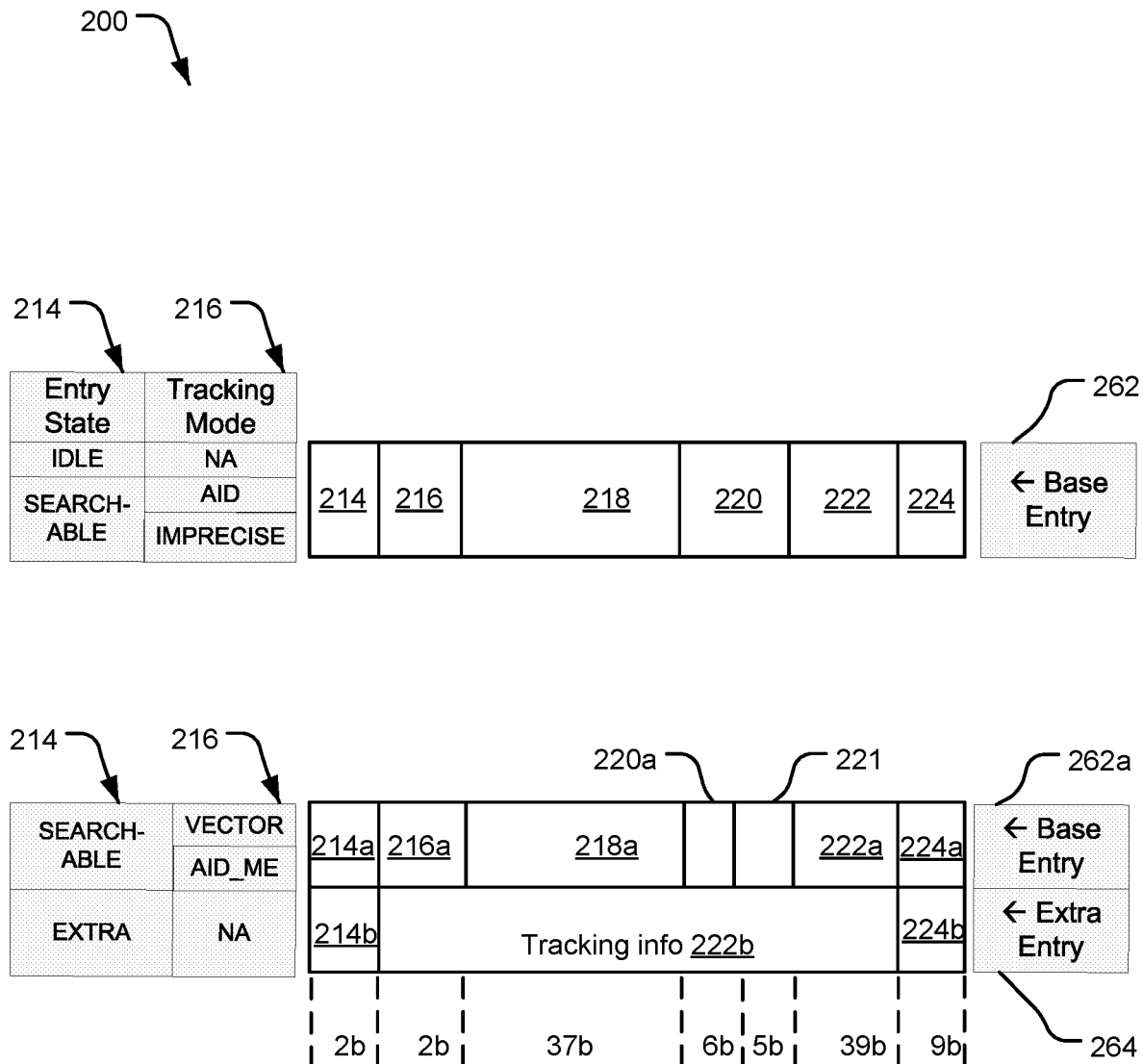
FIG. 2 illustrates an example structure of a snoop filter entry implementing the technology disclosed herein.

FIG. 2 illustrates a structure of a logical snoop filter entry 200 implementing the technology disclosed herein. Specifically, the logical snoop filter entry 200 may be configured to hold up to n agent IDs (AIDs) in a base SFT entry 262 and to dynamically allocate an extra SFT entry 264 in an SFT set for the cases where a cogran is shared by more than n agents. For example, in one implementation n may be three (3) such that the base SFT entry 262 is configured to hold up to 3 AIDs and in cases where a cogran is shared by more than 3 agents, the extra SFT entry 264 is dynamically allocated. Additionally, when the extra SFT entry 264 is dynamically allocated, the base SFT entry 262a may hold a portion of the SFT entry's tracking vector and the extra SFT entry 264 may hold another, remainder, portion of the SFT entry's tracking vector. Alternatively, with the allocation of the extra SFT entry 264, in one mode, both the base SFT entry 262a and the extra SFT entry 264 may be configured to store a series of AIDs.

The base SFT entry 262 may include an Entry_state field 214 that may be set to either IDLE or SEARCHABLE. A Tracking_mode field 216 may be one of NA (if entry_state=IDLE), AID or IMPRECISE. Additionally, the base SFT entry 262 may include a Tag field 218 and a miscellaneous field 220. A Tracking_info field 222 may include 3 AIDs and an ECC field 224 may store error correction code bits.

It may be determined that a logical SFT entry 200 has an extra entry when its Entry_state 214 is set to SEARCHABLE and its Tracking_mode 216 is set to VECTOR or AID_ME. When the Tracking_mode 216 of the base entry 262a is set to VECTOR, the base entry 262a is configured for SFT hit determination and can hold a portion of the SFT entry's tracking vector. When the Entry_state 214 is set to SEARCHABLE, and the Tracking_mode 216 is set to AID_ME, the base entry 262a is configured to store a series of AIDs in its Tracking_info field 222a. Furthermore, in this mode the extra SFT entry 264 is configured to also store a series of AIDs.

Additionally, the base SFT entry 262a may include a Tag field 218a and a miscellaneous field 220a, and an extra_entry field 221. An ECC field 224a may store error correction code bits. The extra_entry field 221 indicates which other SFT physical entry has been assigned to be the extra entry for the logical SFT entry to which a base SFT entry 262a belongs if that logical SFT entry 200 has an extra entry. In one implementation, the extra_entry field 221 is present, even when the logical SFT entry 200 has no associated extra entry. In an alternative implementation, the extra_entry field 221 does not exist when the implementation of the logical SFT entry 200 hard codes for each physical base SFT entry, which other physical entry has been pre-assigned to be that physical base SFT entry's extra entry when the logical SFT entry 200's state indicates that it has an extra entry.

The extra SFT entry 264 may have its entry_state field 214b set to EXTRA and its Tracking_mode field is (not applicable) NA. The remainder of the portion of the SFT entry's tracking vector may be stored in a Tracking_info field 222b when the tracking_mode 216 is set to VECTOR or store a series of AIDs when the tracking_mode 216 is set to AID_ME. An ECC field 224b may store error correction code bits.

Thus, the logical SFT entry 200 is either (a) just the base SFT entry 262 when it has no associated extra SFT entry or (b) a combination of the base SFT entry 262a and its associated extra SFT entry 264. The base SFT entry 262 participates in SFT lookups in that the base SFT entry 262 contains a cogran's tag that is compared against tag bits of a physical address (PA) of the cogran to determine whether the lookup finds a hit in the SFT. For example, for a 64-byte cogran being tracked in a 16-way SFT, the tag bits of the PA of the cogran may be PA[47:16], which may be compared with a Tag field of the SFT entry 262. On the other hand, the extra SFT entry 264 may be associated with a base SFT entry, such as base SFT entry 262a and may contain agent tracking information for that base SFT entry.

Figure 3:
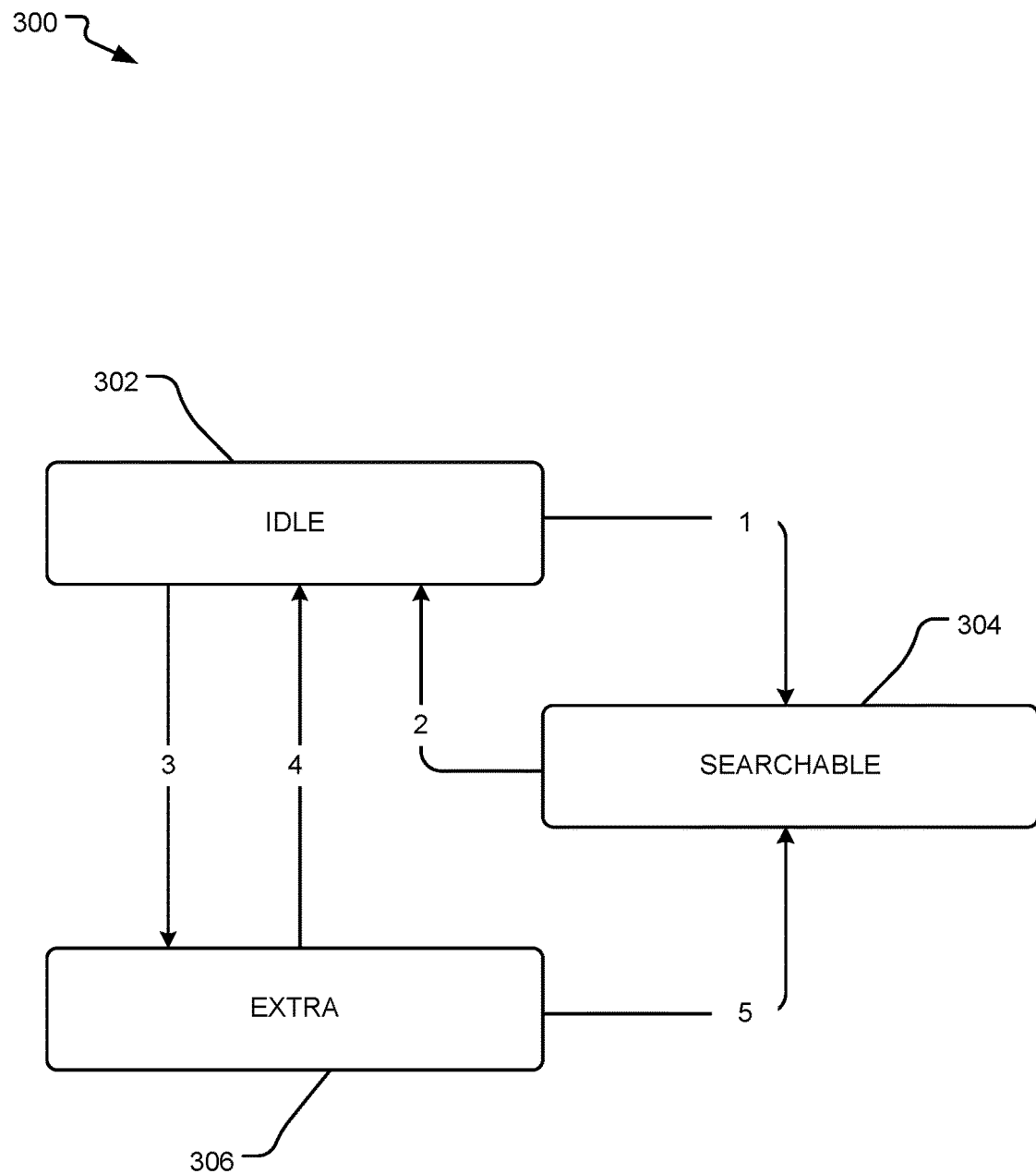
FIG. 3 illustrates example entry_state for the logical SFT entry of the cache coherence system disclosed herein.

FIG. 3 illustrates example entry states 300 for the physical SFT entry of the cache coherence system disclosed herein. As illustrated herein the each logical SFT entry independently switches between the three entry states, namely: IDLE 302, SEARCHABLE 304, and EXTRA 306, depending on real-time conditions and its configuration settings. Specifically, the cache coherence system disclosed herein allows going back to using a single SFT physical entry to hold a logical SFT entry when a logical SFT entry's extra entry is no longer needed to hold tracking information. Thus, the entry_state of a physical entry may change from EXTRA 306 to IDLE 302 when (a) when the extra SFT entry is deallocated in response to determining that the number of agents tracked by the extra SFT entry is reduced to the point that the base SFT entry can hold that information, (b) when the extra SFT entry is deallocated in response to determining that only a single agent is tracked by the extra SFT entry, for example by determining that a single vector bit remains valid, and (c) when a logical SFT entry including two physical SFT entries are consolidated into a logical SFT entry including only one physical SFT entry in response to victimization of a logical SFT entry's extra physical SFT entry.

A physical SFT entry's entry state may also change from EXTRA 306 to SEARCHABLE 304 when a logical SFT entry including two physical SFT entries are consolidated into a logical SFT entry including only one physical SFT entry in response victimization of a logical SFT entry's base physical SFT entry. In this case, the former extra SFT entry becomes the new base SFT entry. In other words, a logical SFT entry that's comprised of two physical SFT entries may be consolidated into a single physical SFT entry (a) if the extra SFT entry is victimized or if it's no longer needed to hold tracking_info, and therefore the extra SFT entry may be de-allocated or (b) if the base SFT entry is victimized, and therefore, the logical SFT entry may be consolidated to a single physical SFT entry that was formerly its extra SFT entry.

Figure 4:
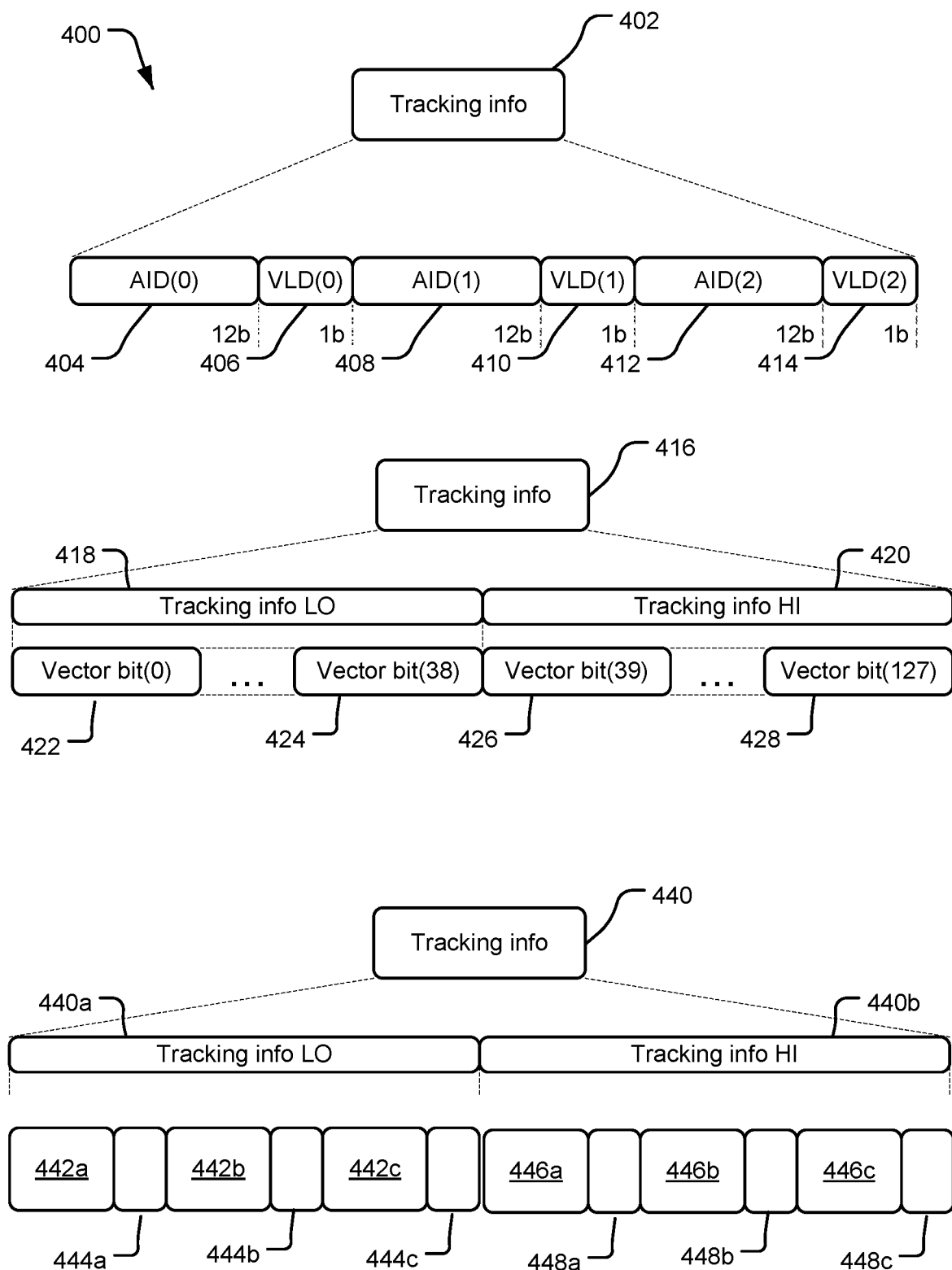
FIG. 4 illustrates example usages of a tracking_information field for the logical SFT entry of the cache coherence system disclosed herein.

FIG. 4 illustrates example values of a tracking_info field 400 for the logical SFT entry of the cache coherence system disclosed herein. The tracking_info field 400 may store tracking information regarding the agents being tracked by the SFT entry. Specifically, in an AID mode, the width of the tracking_info field 402 may be provisioned to hold up to 3 AIDs with a width of 13b each, including 12b to identify the AID and 1b to indicate whether the AID is currently valid. In an alternative implementation, a different number of bits may be used to identify the AID. As illustrated herein, in the AID mode the tracking_info field 402 includes an AID (0) 404 and its validity bit 406, an AID (1) 408 and its validity bit 410, and an AID (2) 412 and its validity bit 414. In the VECTOR mode, 128b of the tracking_info field 416 are divided such that the first 39b of the tracking vector are stored in a tracking_info_LO field 418 in base entry 262a with the remaining bits of the vector stored in a tracking_info_HI field 420 in the extra entry 264. Alternatively, the width of the tracking_info field 416 may be as wide as necessary to track as many agents that may obtain a cogran, and therefore need to be snooped. Furthermore, in an alternative implementation, the 128b of the tracking_info field 416 may be divided in an alternative manner, such as for example, zero (0) bits in the tracking_info_LO field 418 and all bits in the tracking_info_HI field 420.

In this implementation, each agent that needs to be tracked by the SFT may have a unique validity bit in the tracking_info that maps to a particular vector bit position. Thus, for example, the tracking_info_LO field 418 may have 39 validity bits 422-424 and the tracking_info_HI field 418 may have 89 validity bits 426-428. Thus, for example, if a validity bit 15 has a value valid, it indicates a valid cache validity state for the agent corresponding to the validity bit 15 indicating that this agent has cached the cogran corresponding to the Tag field of the SFT entry. On the other hand, if a validity bit 22 has a value invalid, it indicates an invalid cache validity state for the agent corresponding to the validity bit 22 indicating that this agent has not cached the cogran corresponding to the Tag field of the SFT entry.

When the base entry of the logical SFT entry is in the AID_ME mode, the tracking_info 440a field of the base SFT entry holds a series of AIDs 442 and related validity bits 444. Furthermore, in this mode the tracking_info field 440b of the extra SFT entry also holds a series of AIDs 446 and related validity bits 448. Here each AID 442, 446 may be 12b and the validity bits 444, 448 may be 1 bit.

Figure 5:
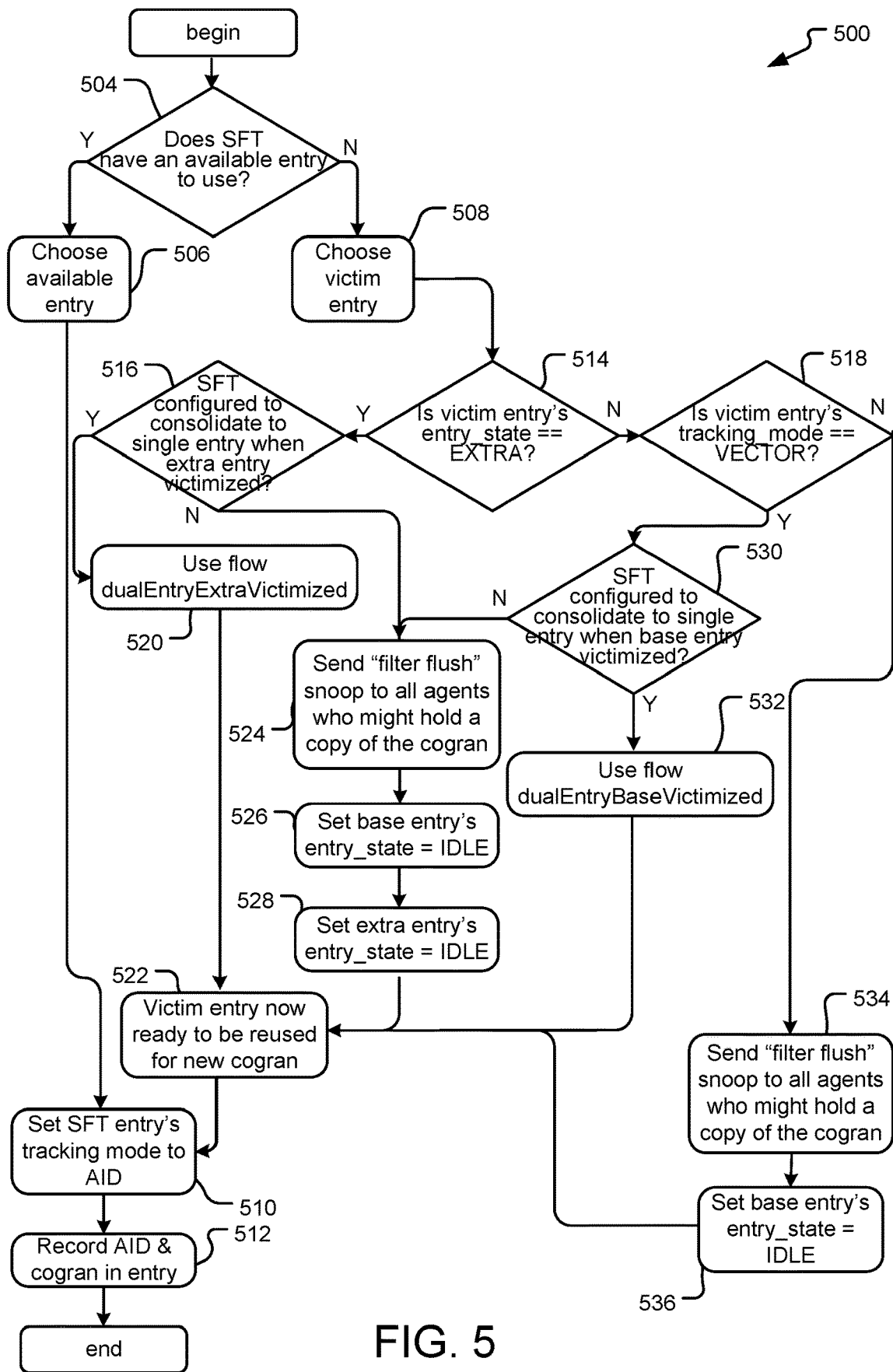
FIG. 5 illustrates example operations when an SFT needs to allocate an entry to begin tracking a new cogran.

FIG. 5 illustrates operations 500 when an SFT needs to allocate an entry to begin tracking a new cogran. Specifically, when the SFT needs to start tracking a cogran, it attempts to allocate an available physical entry to serve as the new logical SFT entry. An operation 504 determines if an SFT entry is available for use. If an SFT entry is available, an operation 506 chooses an available SFT entry, an operation 510 sets the available SFT entry's tracking_mode to AID, and an operation 512 records the AID and the cogran in the selected SFT entry.

If no physical entry is available, i.e., if no SFT entry is IDLE, an operation 508 selects an existing entry to victimize. Subsequently, an operation 514 determines if the selected SFT entry's entry_state is EXTRA. If so, an operation 516 determines if the SFT is configured to consolidate the selected entry to a single SFT entry when the selected extra SFT entry is victimized. If yes, an operation 520 uses the operations disclosed below in FIG. 6 to consolidate to a single SFT entry and as per operation 522 the victimized SFT entry is now made available to be reused for the new cogran. Once the victimized entry is no longer in use, it's now available to be reused for the new cogran to be installed in the SFT. In this case, the entry's entry_state is set to SEARCHABLE, its tracking_mode is set to AID, its tag field is updated for the new cogran, and its tracking_info is updated to hold the AID of the agent obtaining a copy of the cogran, and as part of updating the tracking_info, the VLD bit associated with the AID field it wrote is set.

If the SFT is not configured to consolidate the selected entry to a single SFT entry an operation 524 sends a filter flush snoop to all agents who may hold a copy of the victimized cogran, the cogran that's being tracked by the victimized SFT entry. Subsequently, an operation 526 sets the entry_state of the selected logical SFT entry's base SFT entry to IDLE and an operation 528 sets the entry_state of the selected logical SFT entry's extra SFT entry to IDLE.

If the operation 514 determines that the selected SFT entry's entry_state is not EXTRA, an operation 518 determines if the selected SFT entry's tracking_mode is VECTOR. If yes, an operation 530 determines if the SFT is configured to consolidate the selected entry to a single SFT entry when the selected base SFT entry is victimized and if so, an operation 532 uses the operations of FIG. 7 below to consolidate to a single entry.

If the operation 518 determines that the selected SFT entry's tracking_mode is not VECTOR, an operation 534 sends a sends a filter flush snoop to all agents who may hold a copy of the victimized cogran. Subsequently, an operation 536 sets the entry_state of the selected logical SFT entry's base SFT entry to IDLE.

Figure 6:
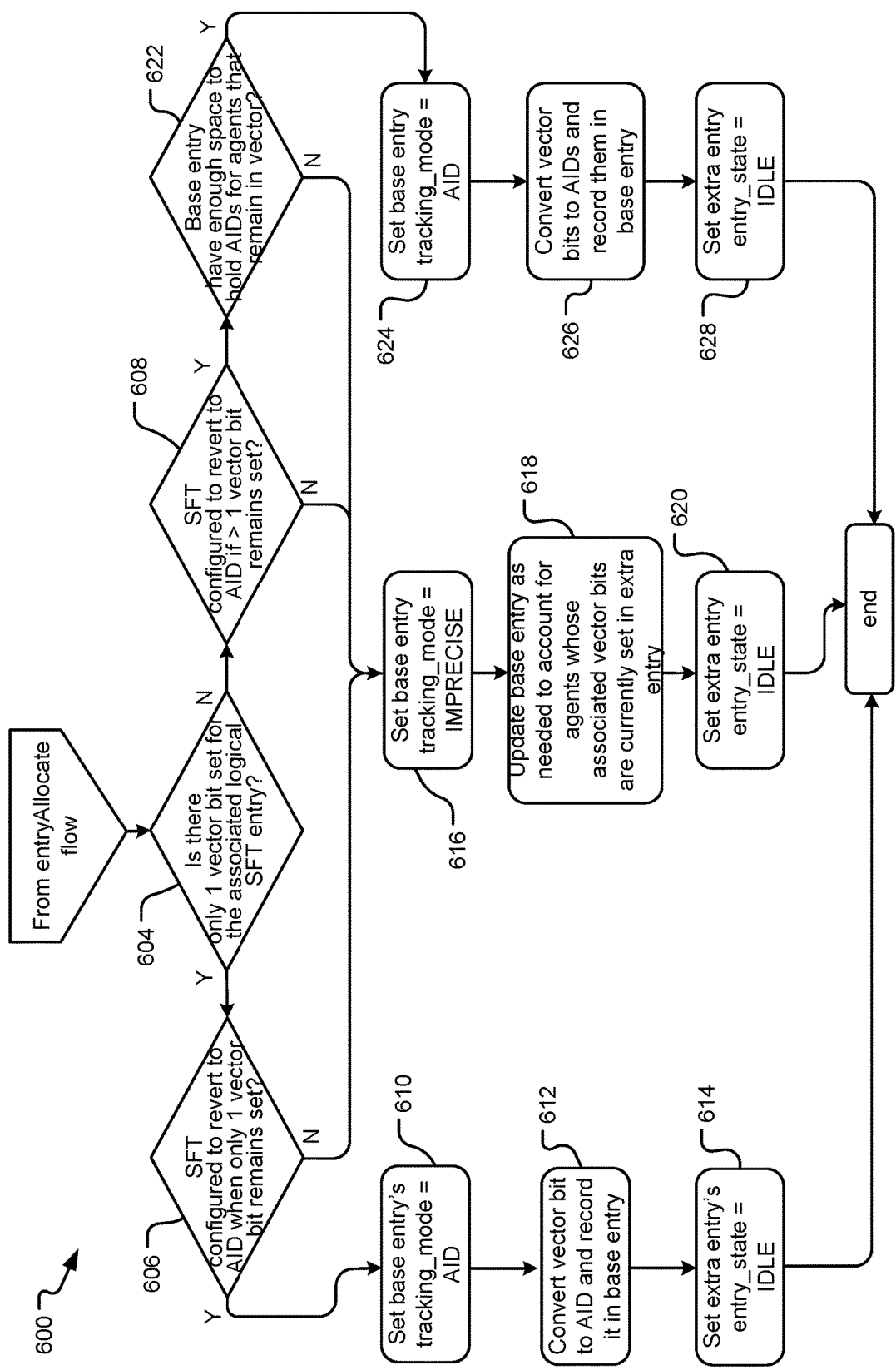
FIG. 6 illustrates example operations when an SFT is configured to consolidate to a single entry when an extra entry is victimized.

FIG. 6 illustrates operations 600 when an SFT is configured to consolidate to a single entry when an extra entry is victimized. Specifically, if any of the following conditions (a)-(c) about the logical SFT entry to which the victim extra entry belongs is true, then when the extra entry's entry_state is changed to IDLE (because it was victimized), the base entry's tracking_mode is changed to IMPRECISE. If the logical SFT entry: (a) the logical SFT entry to which the victim extra entry belongs is currently tracking more agents than a single physical entry alone is able to track precisely, (b) the logical SFT entry to which the victim extra entry belongs has >1 vector bit asserted and the SFT is configured to change its tracking_mode to IMPRECISE when >1 vector bit asserted upon consolidation, or (c) the logical SFT entry to which the victim extra entry belongs has 1 vector bit asserted and the SFT is configured to change its tracking_mode to IMPRECISE even when 1 vector bit asserted upon consolidation.

Specifically, an operation 604 determines if only one (1) vector bit is set for the logical SFT entry to which the victim extra entry belongs. If yes, an operation 606 determines if the SFT is configured to revert its tracking_mode 216 to AID when only one vector bit remains set. If the SFT is not configured to revert its tracking_mode 216 to AID when only one vector bit remains set, an operation 616 sets the tracking_mode of the base SFT entry to IMPRECISE. Subsequently, an operation 618 updates that base entry as needed to account for agents whose associated vector bit are currently set in the extra entry, and an operation 620 sets the tracking_mode of the extra SFT entry to IDLE. Note that an agent may be indicated by either the position of its bit in a tracking vector or by an AID. If the operation 606 determines that the SFT is configured to revert its tracking_mode 216 to AID when only one vector bit remains set, an operation 610 sets the tracking_mode of the base SFT entry to AID, an operation 612 converts the vector bit to the equivalent AID, records the AID in the base SFT entry, sets the corresponding VLD bit for the AID field being written, and an operation 614 sets the entry_state of the extra SFT entry to IDLE.

If the operation 604 determines if more than one (1) vector bit is set for the logical SFT entry to which the victim extra entry belongs, an operation 608 determines if the SFT is configured to revert its tracking_mode 216 to AID when more than one vector bit remains set. If yes, an operation 622 further determines if the base SFT entry has enough space to hold the AIDs corresponding to the agents that remain in the vector (i.e., whose vector bits remain set). If yes, an operation 624 sets the tracking_mode of the base SFT entry to AID, an operation 626 converts the vector bits to AIDs and records the vector in the base SFT entry, and an operation 628 sets the entry_state of the extra SFT entry to IDLE.

Figure 7:
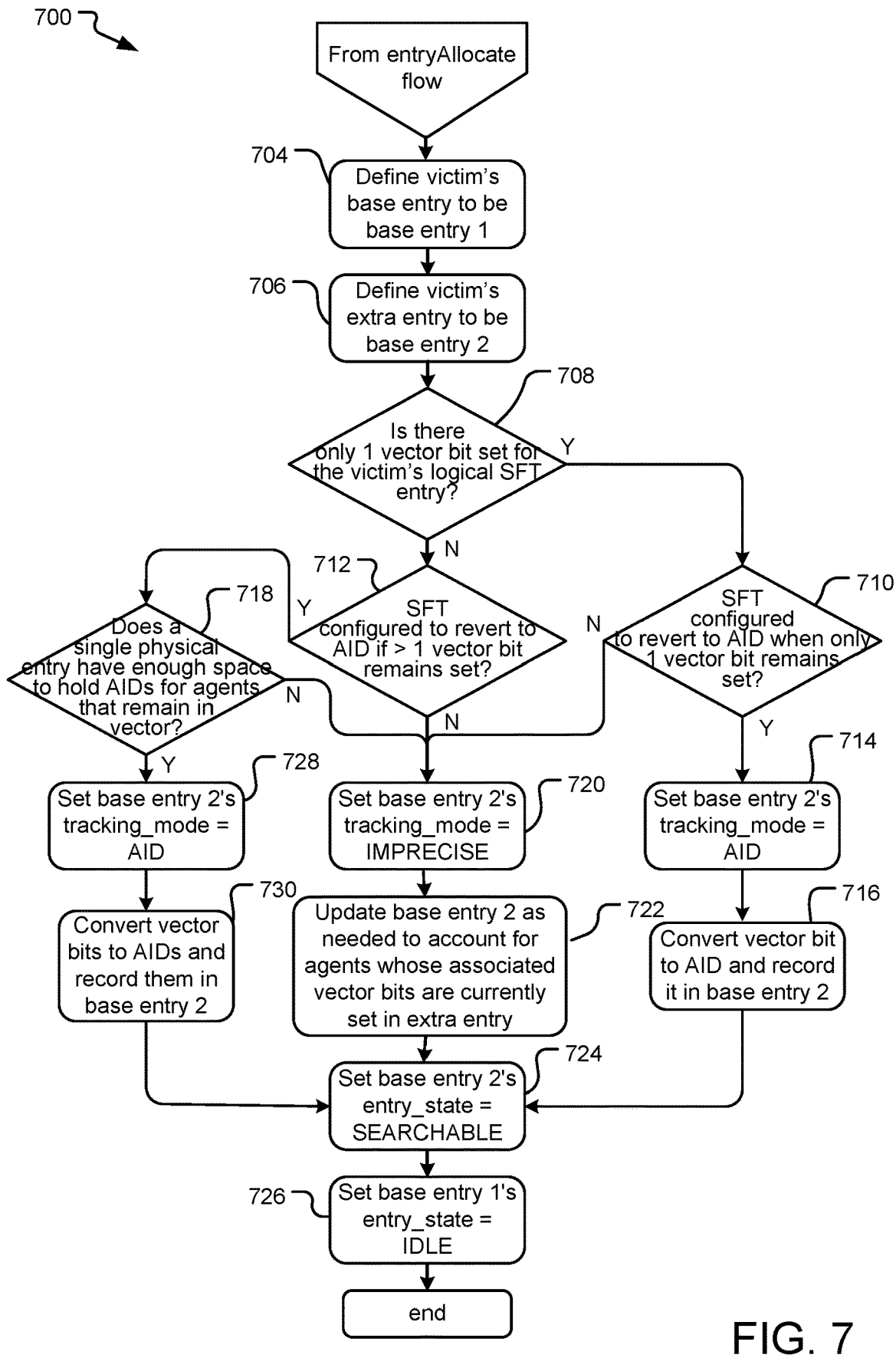
FIG. 7 illustrates example operations when the SFT is configured to consolidate to a single entry when a base entry is victimized and when the SFT needs to victimize a base entry that has an associated extra entry.

FIG. 7 illustrates operations 700 when the SFT is configured to consolidate to a single entry when a base entry is victimized and when the SFT needs to victimize a base entry that has an associated extra entry. An operation 704 defines "base entry 1"=the victim logical SFT entry's base entry and an operation 706 defines "base entry 2"=the victim logical SFT entry's extra entry. In this case, if any of the following conditions about the logical SFT entry being victimized is true, then when the logical entry is consolidated into a single physical entry (base entry 2), base entry 2's tracking_mode is set to IMPRECISE: (a) if the logical SFT entry is currently tracking more agents than a single physical entry alone is able to track precisely, (b) if the logical SFT entry has >1 vector bit asserted and the SFT is configured to change its tracking_mode to IMPRECISE when >1 vector bit is asserted upon consolidation, or (c) if the logical SFT entry has 1 vector bit asserted and the SFT is configured to change its tracking_mode to IMPRECISE even when 1 vector bit is asserted upon consolidation.

Therefore, an operation 708 determines if there is only one vector bit that is set for the victim logical SFT entry. If yes, an operation 710 determines if the SFT is configured to revert an SFT entry's tracking_mode to AID when only one vector bit remains set. If so, an operation 714 sets the base entry 2's tracking_mode to AID and an operation 716 converts that vector bit to the equivalent AID, records the AID in the base entry 2's tracking_info, and sets the VLD bit corresponding to the AID field that's being written in base entry 2. Subsequently, an operation 724 sets base entry 2's entry_state to SEARCHABLE and an operation 726 sets the base entry 1's entry_state to IDLE.

If the operation 708 determines that more than one vector bits are set for the victim logical SFT entry, an operation 712 determines if the SFT is configured to revert an SFT entry's tracking_mode to AID if more than one vector bit remains set. If yes, an operation 718 determines if a single physical entry of the SFT has enough space to hold AIDs corresponding to the agents that remain in the vector (i.e., whose vector bits remain set). If yes, an operation 728 sets the base entry 2's tracking_mode to AID and an operation 730 converts the vector bits to their corresponding AIDs, records the AIDs in base entry 2, and sets the VLD bits corresponding to the AID fields of the tracking_info that are being written to base entry 2. Subsequently the control passes to operation 724.

If (a) the operation 710 determines that the SFT is not configured to revert an SFT entry's tracking_mode to AID when only one vector bit remains set, (b) the operation 712 determines that the SFT is not configured to revert an SFT entry to AID if more than one vector bit remains set, or (c) if the operation 718 determines that no single physical entry of the SFT has enough space to hold AIDs for agents that remain in the vector, then an operation 720 sets the base entry 2's tracking_mode to IMPRECISE. Subsequently, an operation 722 updates the base entry 2 as needed to account for agents whose associated vector bits are currently set in the extra SFT entry, and the control passes to operation 724. Thus, regardless of whether base entry 2's tracking_mode ends up set to AID or IMPRECISE, base entry 2's entry_state is set to SEARCHABLE and base entry 1's entry_state is set to IDLE. Furthermore, the base entry 1 can now be used as needed for another logical SFT entry.

Figure 8:
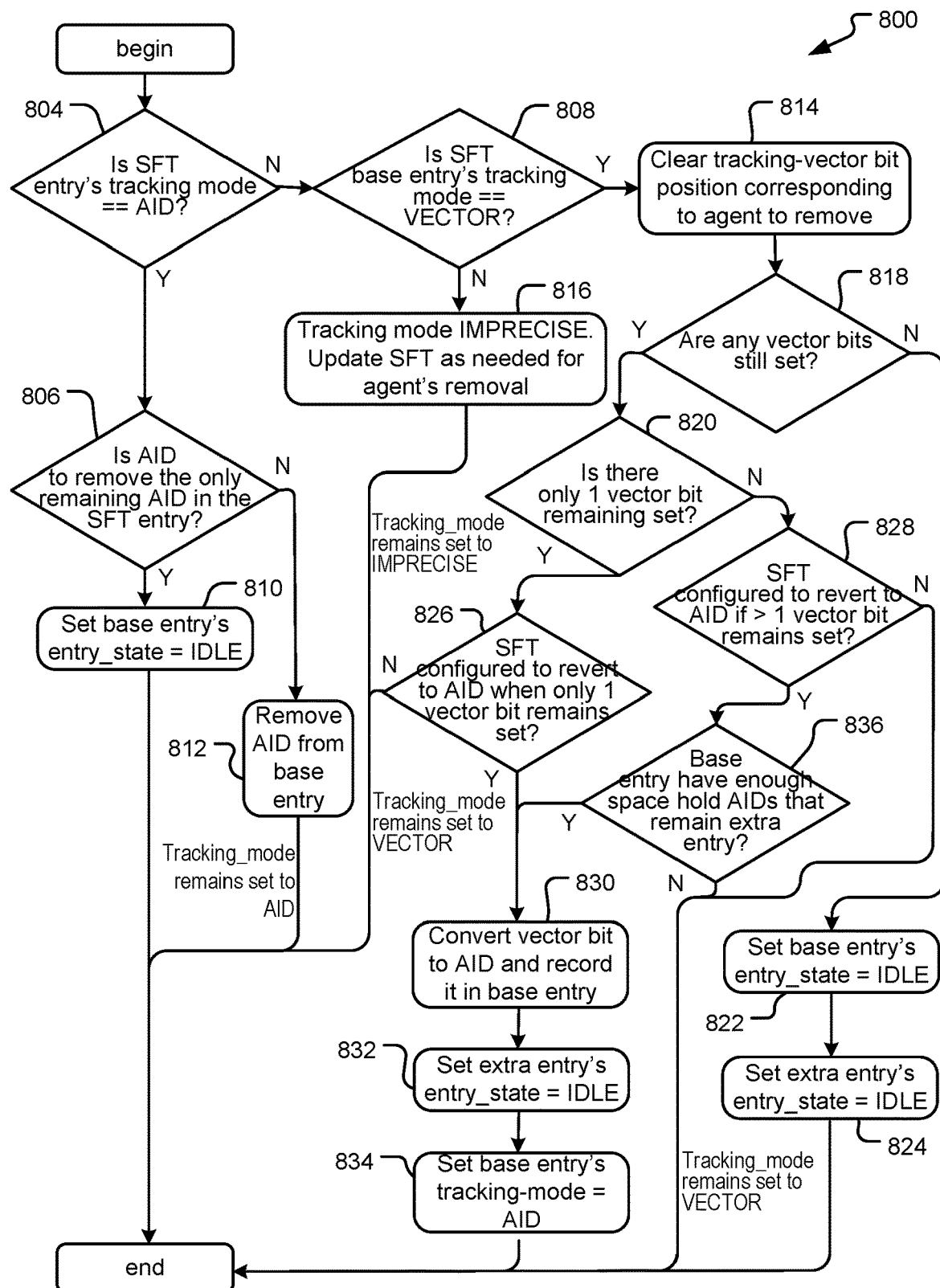
FIG. 8 illustrates example operations for a case for updating a logical entry when an agent gives up its copy of a cogran.

FIG. 8 illustrates operations 800 for a case for updating a logical SFT entry when an agent gives up its copy of a cogran. An operation 804 determines if the tracking_mode of the SFT entry that needs to be updated is set to AID. If so, an operation 806 further determines if the AID to be removed is the only remaining AID in the SFT entry. If yes, an operation 810 sets the base entry's entry_state to IDLE. However, if the AID to be removed is the not the only remaining AID in the SFT entry, an operation 812 removes the AID from the base entry.

If the operation 804 determines that the tracking_mode of the SFT entry that needs to be updated is not set to AID, an operation 808 determines if the base SFT entry's tracking_mode is set to VECTOR. If the base SFT entry's tracking_mode is not set to VECTOR, an operation 816 determines that the tracking_mode is IMPRECISE and updates the SFT as needed for removal of the agent from the SFT entry's tracking_info. If the base SFT entry's tracking_mode is set to VECTOR, an operation 814 clears the tracking vector bit position corresponding to the agent that's being removed from the tracking_info. Subsequently, an operation 818 determines if any bits of the tracking vector are still set. If no bits of the tracking vector are still set, an operation 822 sets the base SFT entry's entry_state to IDLE and an operation 824 sets the extra SFT entry's entry_state to IDLE.

If one or more bits of the tracking vector are still set, an operation 820 determines if there is only one bit of the tracking vector that is still set. If there is only one bit of the tracking vector still remains set, an operation 826 further determines whether the SFT is configured to revert its tracking_mode to AID when only one vector bit remains set. If yes, it indicates that the SFT is configured to allow the extra base entry to be de-allocated while the logical SFT entry continues to track the cogran when there is only a single vector bit asserted. In this case an operation 830 coverts the vector bit to its equivalent AID and records the AID in the base SFT entry and the AID field's corresponding VLD bit is set. An operation 832 sets the extra SFT entry's entry_state to IDLE indicating de-allocation of the extra SFT entry and an operation 834 sets the base SFT entry's tracking_mode to AID. If the operation 826 determines the SFT is not configured to revert its tracking_mode to AID when only one vector bit remains set, the base SFT entry's tracking_mode remains set to VECTOR and the extra SFT entry continues to be used.

If the operation 820 determines that more than one bit of the tracking vector remains set, an operation 828 determines whether the SFT is configured to revert its tracking_mode to AID when more than one vector bit remains set. If the operation 828 determines the SFT is configured to revert its tracking_mode to AID when more than one vector bit remains set, an operation 836 further determines if the base SFT entry has enough space to hold AIDs corresponding to the agents whose vector bits remain set. If so, the control is transferred to operation 830 to covert the vector bits to their equivalent AIDs, record the AIDs in the base SFT entry, and set their corresponding VLD bits in the base SFT entry.

Figure 9:
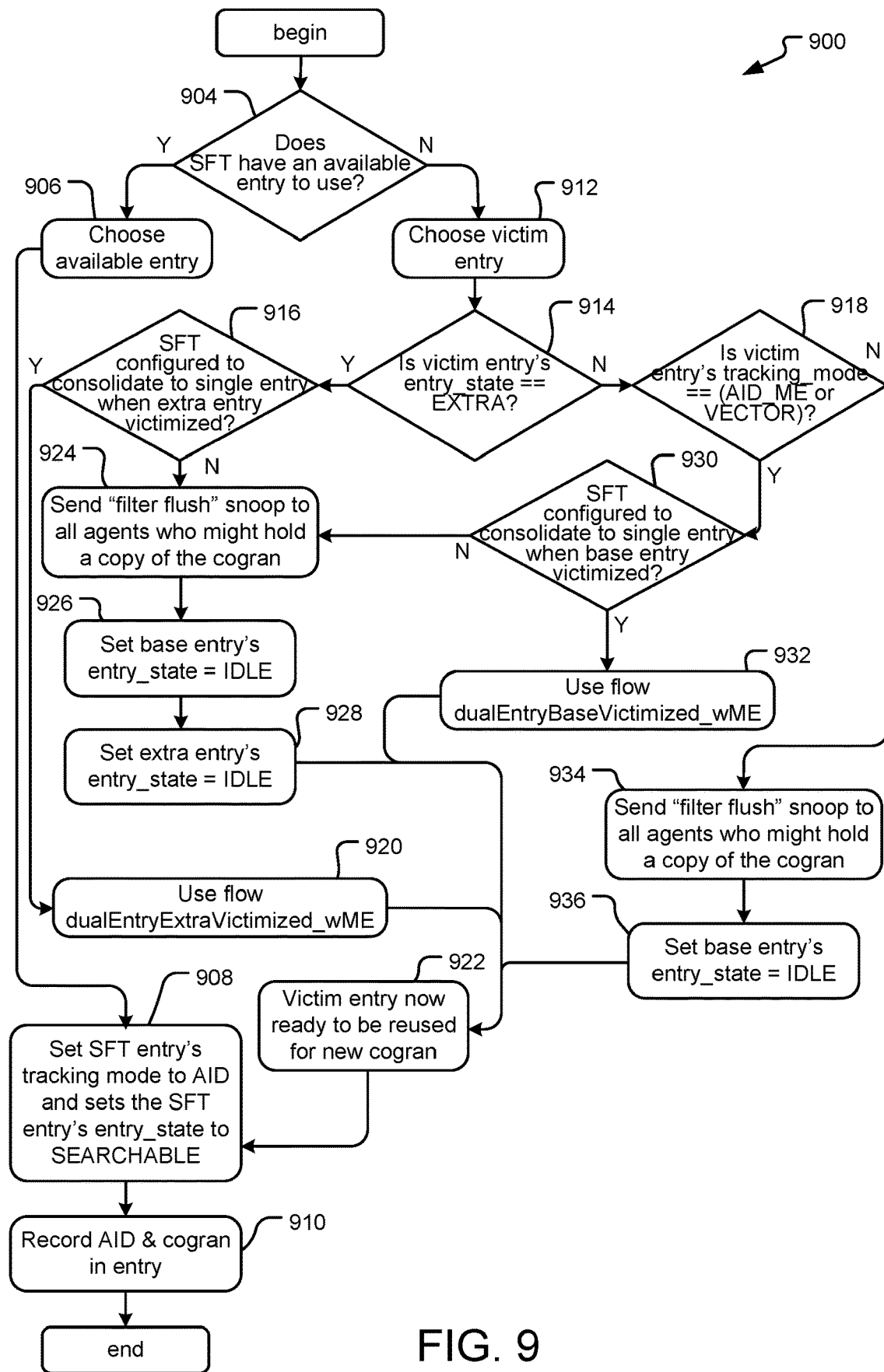
FIG. 9 illustrates example operations for a case when the SFT needs to allocate an entry to begin tracking a cogran.

FIG. 9 illustrates operations 900 for a case when the SFT needs to allocate an entry to begin tracking a cogran. Specifically, as per operations 900 when the SFT needs to allocate an entry to begin tracking a cogran, it selects one of the available (if any) physical SFT entries to be the base SFT entry for the logical SFT entry that's being allocated. If no physical SFT entry is available to be used, i.e., none is IDLE, the SFT selects an SFT entry to victimize. An operation 904 determines if the SFT has a physical SFT entry available for use. If so, an operation 906 selects an available SFT entry. Subsequently, an operation 908 sets the selected SFT entry's tracking_mode to AID and sets the SFT entry's entry_state to SEARCHABLE and an operation 910 records the agent's AID, sets the VLD bit for the AID field, and records the cogran's tag in the selected SFT entry.

If no SFT entry is available to be used, an operation 912 selects a victim entry. Subsequently, an operation 914 determines if the selected victim entry's entry_state is EXTRA. If the selected victim entry's entry_state is EXTRA, an operation 916 determines whether the SFT is configured to consolidate a logical SFT entry to a single SFT entry when the extra SFT entry of the logical SFT entry is victimized. If yes, an operation 920 initiates the operations further disclosed below in FIG. 10 and an operation 922 indicates that a victim entry is now ready to be used with the new cogran. If the operation 916 determines that the SFT is not configured to consolidate a logical SFT entry to a single SFT entry when the extra SFT entry of the logical SFT entry is victimized, an operation 924 sends a filter flush snoop for the victimized cogran to all agents who may hold a copy of the victimized cogran. Subsequently, an operation 926 sets the base SFT entry's entry_state to IDLE and an operation 928 sets the extra SFT entry's entry_state to IDLE.

If the operation 914 determines that the selected victim entry's entry_state is not EXTRA, an operation 918 determines whether the selected victim entry's tracking_mode is either AID_ME or VECTOR. If no, an operation 934 sends a filter flush snoop to all agents who may hold a copy of the victimized cogran and an operation 936 sets the base SFT entry's entry_state to IDLE. If the operation 918 determines that the selected victim entry's tracking_mode is either AID_ME or VECTOR, an operation 930 determines if the SFT is configured to consolidate a logical entry to a single entry when a base SFT entry is victimized. If so, an operation 932 calls the operations disclosed below in FIG. 11 and as per operation 922 the victim entry is now ready to be reused for the new cogran.

Figure 10:
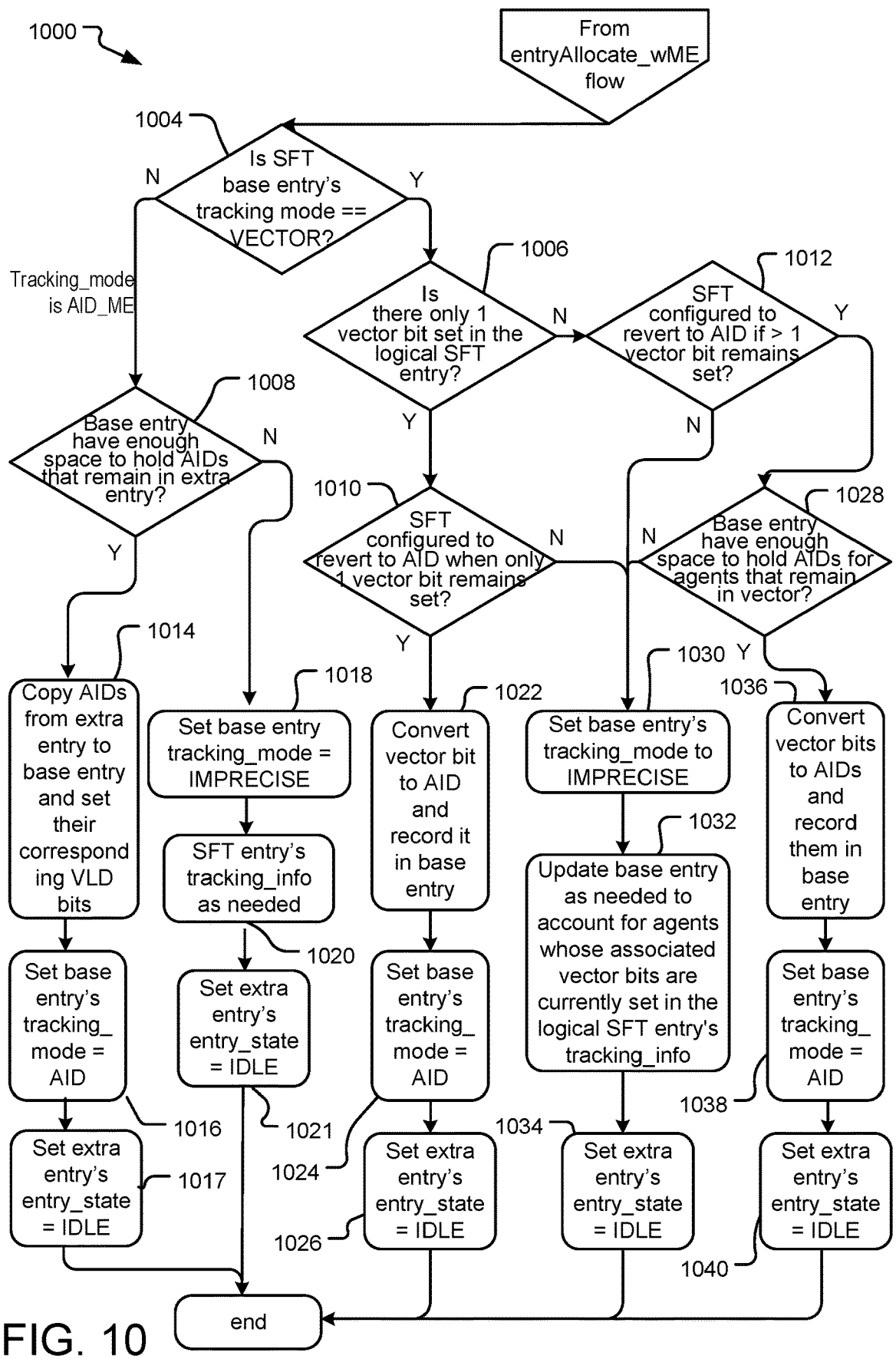
FIG. 10 illustrates example operations for a case when a logical SFT entry is comprised of two physical entry's and the logical SFT entry's extra entry has been selected to be victimized.

FIG. 10 illustrates operations 1000 for a case when a logical SFT entry is comprised of two physical entries and the logical SFT entry's extra entry has been selected to be victimized. The operations 1000 may be initiated at 920 in response to determining that the SFT is configured to consolidate a logical SFT entry to a single SFT entry when the extra SFT entry of the logical SFT entry is victimized. Specifically, these operations are for a case when a logical SFT entry is comprised of two physical entry's and the logical SFT entry's extra entry has been selected to be victimized. An operation 1004 determines whether the base SFT entry's tracking_mode is set to VECTOR. If not, the tracking_mode is set to AID_ME and an operation 1008 determines if the base SFT entry has enough space to hold the AIDs that are remaining in the extra SFT entry being victimized. If so, an operation 1014 copies the AIDs from the extra entry to the base SFT entry and an operation 1016 sets the base SFT entry's tracking_mode to AID, and an operation 1017 sets the extra SFT entry's entry_state to IDLE.

If the operation 1008 determines that the base SFT entry does not have enough space to hold the AIDs that are remaining in the extra SFT entry being victimized, an operation 1018 sets the base SFT entry's tracking mode to IMPRECISE and an operation 1020 updates the base SFT entry as needed to account for agents whose AIDs are currently valid in the logical SFT entry's tracking_info. Subsequently, operation 1021 sets the extra SFT entry's entry_state to IDLE.

If the operation 1004 determines that the base SFT entry's tracking_mode is set to VECTOR, an operation 1006 determines whether there is only one vector bit set in the logical SFT entry. If so, an operation 1010 determines if the SFT is configured to revert its tracking_mode to AID when only one vector bit remains set. If so, an operation 1022 converts the vector bit to its equivalent AID, records the AID in the base SFT entry, and sets the corresponding VLD bit for the AID field being written. Subsequently, an operation 1024 sets the base SFT entry's tracking_mode to AID, and an operation 1026 sets the extra SFT entry's entry_state to IDLE. If the SFT is not configured to revert its tracking_mode to AID when only one vector bit remains set, control transfers to operation 1030.

If the operation 1006 determines that there are more than one vector bits set for the associated logical SFT entry, an operation 1012 determines whether the SFT is configured to revert its tracking_mode to AID if more than one vector bit remains set. If no, an operation 1030 sets the base SFT entry's tracking_mode to IMPRECISE, an operation 1032 updates the base SFT entry as needed to account for agents whose associated vector bits are currently set in the logical SFT entry's tracking_info. Subsequently, and an operation 1034 sets the extra SFT entry's entry_state to IDLE. On the other hand, if the operation 1012 determines that the SFT is configured to revert its tracking_mode to AID if more than one vector bit remains set, an operation 1028 determines whether the base SFT entry has enough space to hold AIDs for agents that remain in the tracking vector. If the base SFT entry does not have enough space to hold AIDs for agents that remain in the tracking vector, control transfers to operation 1030 to update the base SFT entry as needed to account for agents whose associated vector bits are currently set in the extra SFT entry.

If the operation 1028 determines that the base SFT entry has enough space to hold AIDs for the number of agents that remain in the tracking vector, an operation 1036 converts vector bits to their equivalent AIDs and records the AIDs along with their associated VLD bits in the tracking_info field of the base SFT entry. Subsequently, an operation 1038 sets the base SFT entry's tracking_mode to AID, and an operation 1040 sets the extra SFT entry's entry_state to IDLE to indicate that the extra SFT entry is available for use for another cogran.

Figure 11:
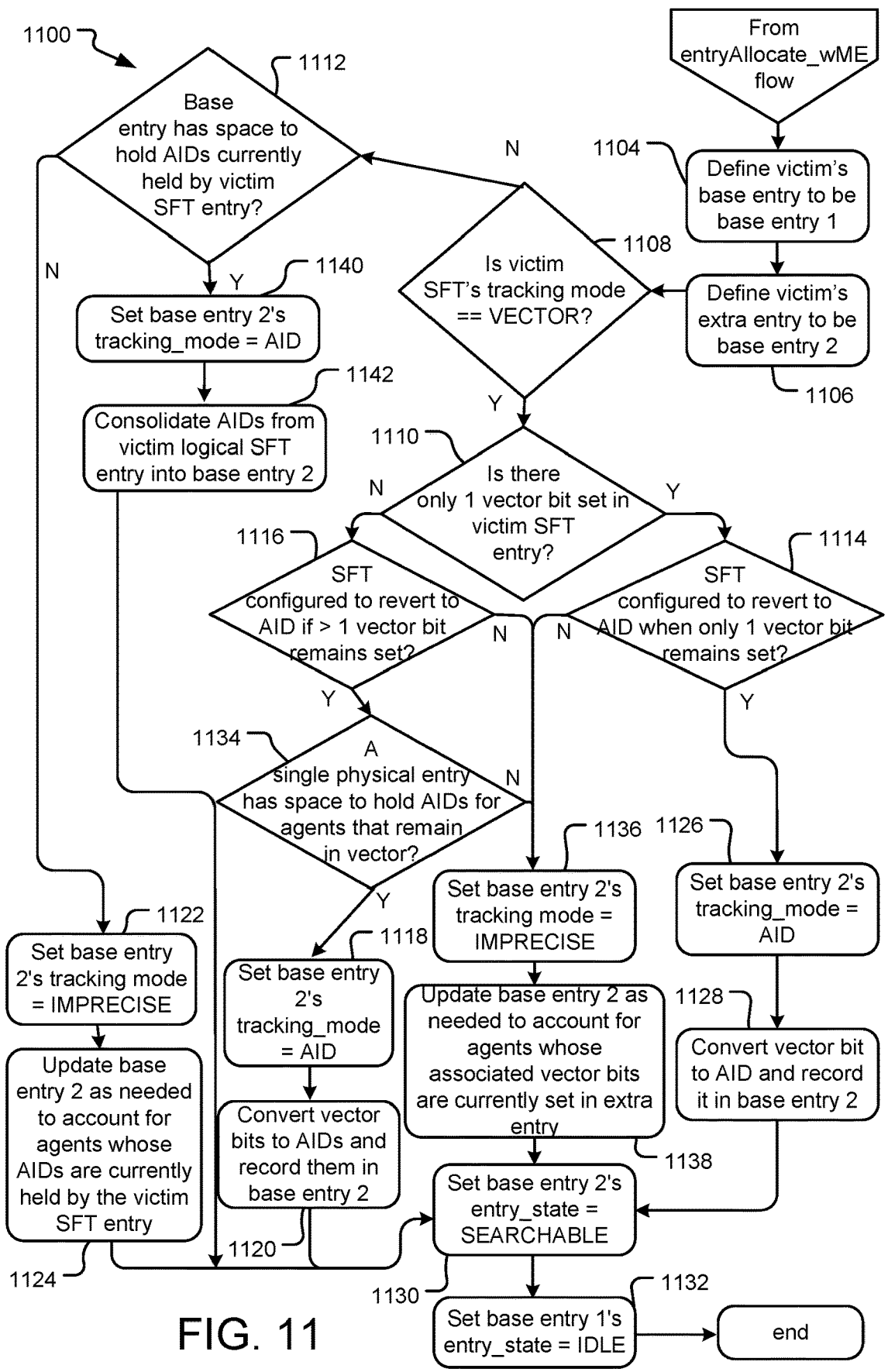
FIG. 11 illustrates alternative example operations for a case when a logical SFT entry is comprised of two physical entry's and the logical SFT entry's base entry has been selected to be victimized.

FIG. 11 illustrates alternative operations 1100 for a case when a logical SFT entry is comprised of two physical entry's and the logical SFT entry's base entry has been selected to be victimized. The operations 1100 may be initiated at 932 in response to determining that the SFT is configured to consolidate a logical entry to a single entry when a base SFT entry is victimized. Specifically, these operations are for a case when a logical SFT entry is comprised of two physical entry's and the logical SFT entry's base entry has been selected to be victimized. An operation 1104 defines the victim SFT entry's base entry as "base entry 1" and an operation 1106 defines the victim SFT entry's extra entry as "base entry 2."

An operation 1108 determines if the victim SFT entry's tracking_mode is set to VECTOR. If not, an operation 1112 determines whether a base SFT entry has enough space to hold all the valid AIDs that remain in the victim SFT entry (also referred to as the victim logical SFT entry). If a base SFT entry does not have enough space to hold all the valid AIDs that remain in the victim logical SFT entry, an operation 1122 sets the base entry 2's tracking_mode to IMPRECISE. An operation 1124 updates the base SFT entry 2 as needed to account for agents whose associated AIDs are currently held by the victim logical SFT entry. Subsequently, an operation 1130 sets the base entry 2's entry_state to SEARCHABLE and an operation 1132 sets the base entry 1's entry-state to IDLE. If the operation 1112 determines that the base SFT entry has enough space to hold the AIDs that remain in the victim logical SFT entry, an operation 1140 sets the base entry 2's tracking_mode to AID and an operation 1142 consolidates the AIDs from the victim logical SFT entry to base entry 2's tracking_info field and sets their associated VLD bits. Subsequently, the operation 1130 sets the base entry 2's entry_state to SEARCHABLE and the operation 1132 sets the base entry 1's entry-state to IDLE.

If the operation 1108 determines that the victim logical SFT entry's tracking_mode is set to VECTOR, an operation 1110 determines if only one vector bit is set in victim logical SFT entry. If more than one vector bits are set for the associated logical SFT entry, an operation 1116 determines whether the SFT is configured to revert its tracking_mode to AID if more than one vector bits remain set. If yes, an operation 1134 determines whether a single physical entry has enough space to hold AIDs for agents that remain in the vector. If yes, the control is transferred to operation 1118. An operation 1118 sets the base entry 2's tracking_mode to AID, and an operation 1120 converts the vector bits from the victim logical SFT entry to their equivalent AIDs, copies those AIDs to base entry 2's tracking_info field and sets their associated VLD bits. However, if operation 1134 determines whether that a single physical entry does not have enough space to hold AIDs for agents that remain in the vector, an operation 1136 sets the base entry 2's tracking_mode to IMPRECISE and an operation 1138 updates the base entry 2 as needed to account for agents whose associated vector bits are currently set in the extra SFT entry. Subsequently, the operation 1130 sets the base entry 2's entry_state to SEARCHABLE and the operation 1132 sets the base entry 1's entry-state to IDLE.

If the operation 1116 determines that the SFT is not configured to revert its tracking_mode to AID if more than one vector bits remain set, in this case also the control transfers to operation 1136 that sets the base entry 2's tracking_mode to IMPRECISE.

If the operation 1110 determines that only one vector bit is set in the victim logical SFT entry, an operation 1114 determines if the SFT is configured to revert its tracking_mode to AID when only one vector bit remains set. If the SFT is not configured to revert to AID when only one vector bit remains set, the control transfers to operation 1136 that sets the base entry 2's tracking_mode to IMPRECISE. However, if the operation 1114 determines that the SFT is configured to revert its tracking_mode to AID when only one vector bit remains set, an operation 1126 sets the base entry 2's tracking_mode to AID and an operation 1128 converts the vector bit to its equivalent AID and records the AID in the tracking_info field of the base entry 2 together with its VLD bits.

Figure 12:
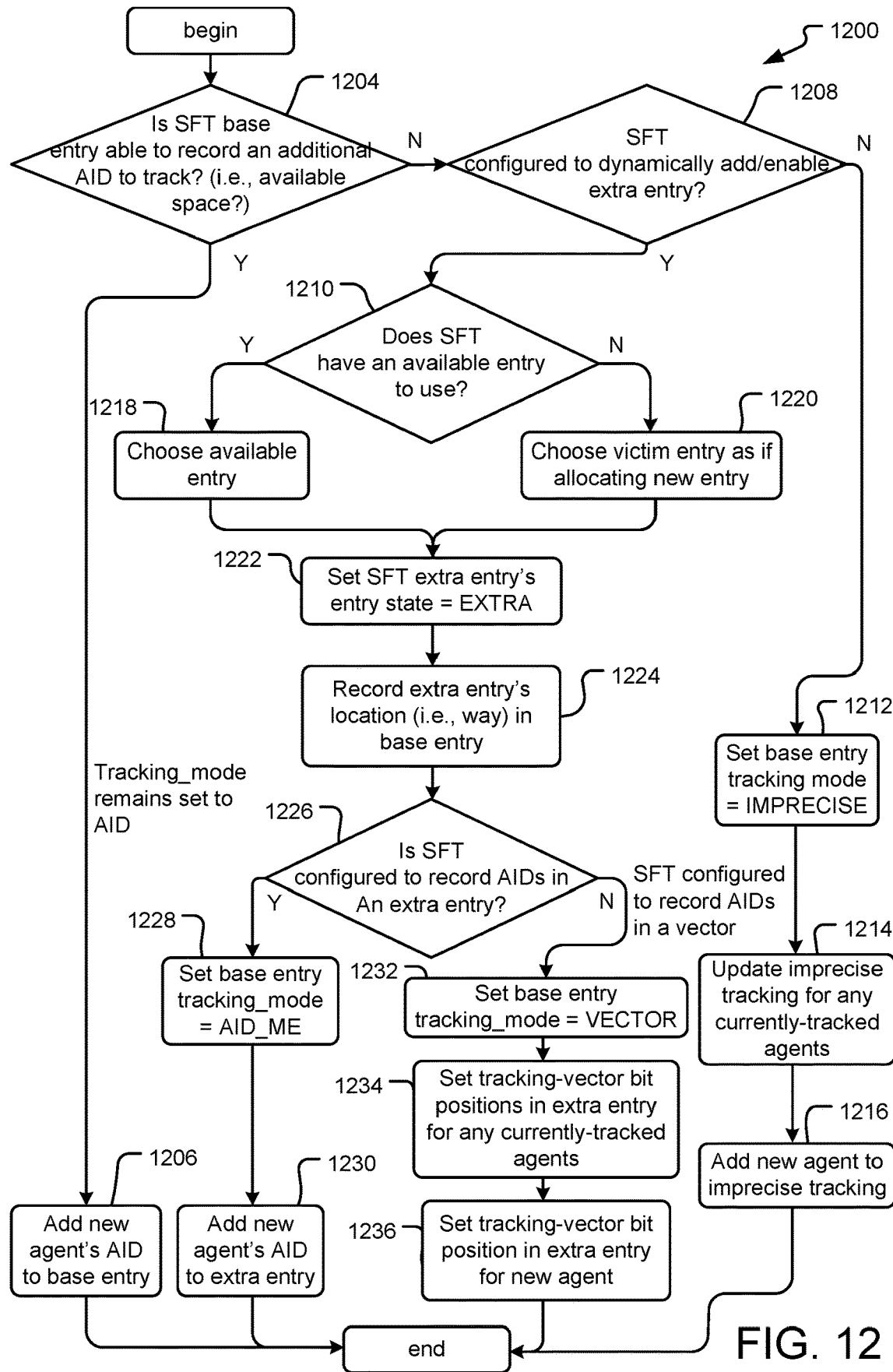
FIG. 12 illustrates example operations for a case when SFT needs to add an agent to its existing tracking for a cogran, the logical SFT entry's tracking_mode=AID, and the logical entry does not have space to record the new AID.

FIG. 12 illustrates operations 1200 for a case when SFT needs to add a new agent to its existing tracking for a cogran, the logical SFT entry's tracking_mode=AID, and the implementation supports holding additional AIDs in an extra SFT entry. Specifically, the implementations disclosed herein allows the SFT to use an extra SFT entry to record the new agent's AID when it's needed. When the SFT is configured to add an AID to a logical SFT entry's extra physical entry, the SFT updates the logical SFT entry's tracking_mode to be AID_ME to indicate the presence of an extra entry and it records the extra entry's location.

An operation 1204 determines if the base SFT entry is able to, or it has space to, record an additional AID in its tracking_info field. If so, an operation 1206 adds the new agent's AID to the tracking_info field of the base SFT entry. If the base SFT entry is not able to record an additional AID to its tracking_info field, an operation 1208 determines if the SFT is configured to dynamically add and enable an extra SFT entry. If the SFT is not configured to dynamically add and enable an extra SFT entry, an operation 1212 sets the base SFT entry's tracking_mode to IMPRECISE, an operation 1214 updates the imprecise tracking for any currently tracked agents, and an operation 1216 adds a new agent to the imprecise tracking.

If the SFT is configured to dynamically add and enable an extra SFT entry, an operation 1210 determines whether SFT has any available entry to use. If so, an operation 1218 selects an available entry. If the SFT does not have any available entry to use, an operation 1220 selects a victim entry as if it were allocating a new entry. If the victim entry's entry_state is EXTRA, refer to FIG. 10; else if the victim entry's tracking_mode is either VECTOR or AID_ME, refer to FIG. 11; else send a "filter flush" snoop on behalf of the victim entry. Once the victim entry's entry_state is able to be set to IDLE, operation 1222 sets that entry's entry_state to EXTRA. Subsequently, an operation 1224 records the extra SFT entry's location, or way, in the base SFT entry. An operation 1226 determines if the SFT is configured to record AIDs in an extra SFT entry. If yes, an operation 1228 sets the base SFT entry's tracking_mode to AID_ME and an operation 1230 adds the new agent's AID to the extra SFT entry and sets the corresponding VLD bit for the AID. If the operation 1226 determines that the SFT is not configured to record AIDs in an extra SFT entry, an operation 1232 sets the base SFT entry's tracking_mode to VECTOR, an operation 1234 sets the tracking vector bit positions in the extra SFT entry corresponding to any currently tracked agents, and an operation 1236 sets the tracking vector bit position in the extra SFT entry for the new agent.

Figure 13:
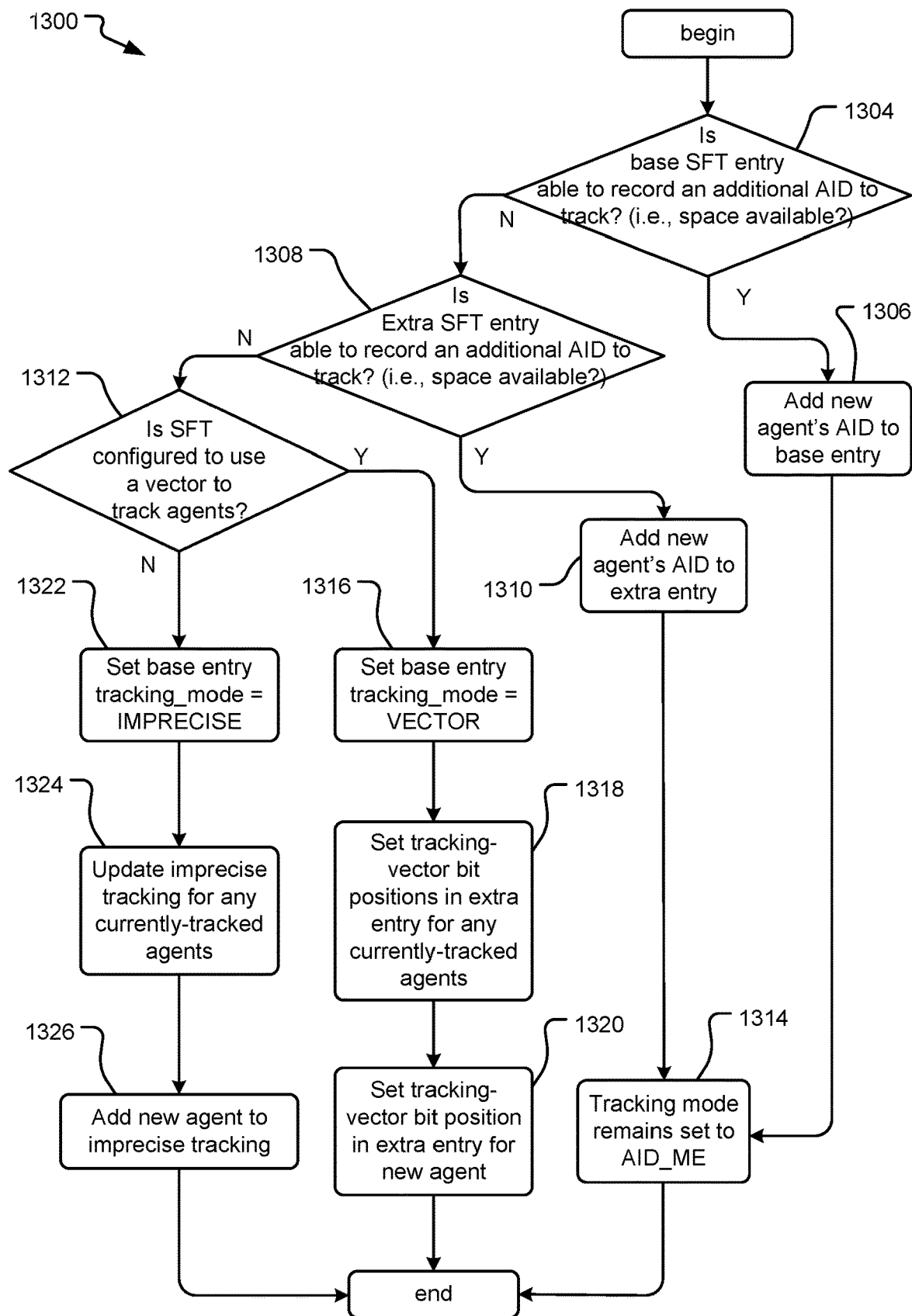
FIG. 13 illustrates example operations for a case when SFT needs to add an agent to its existing tracking for a cogran and the logical SFT entry's tracking_mode is set to AID_ME.

FIG. 13 illustrates operations 1300 for a case when SFT needs to add an agent to its existing tracking for a cogran and the logical SFT entry's tracking_mode is set to AID_ME. Specifically, the operations 1300 adds the new AID to the base SFT entry if the base SFT entry has space to accept the AID or adds the new AID to the extra SFT entry if the extra SFT entry has room to accept the AID. If the logical SFT entry does not have room to record the new AID in either the base SFT entry or the extra SFT entry, it is configured to switch its tracking_mode to VECTOR, in which case, the SFT updates the tracking_mode of the logical SFT entry to VECTOR and sets tracking_info bits as appropriate for all the AIDs that the logical SFT entry currently holds as well as for the new AID of the agent that it's adding to the logical SFT entry. If the SFT is not configured to switch from tracking_mode=AID_ME to tracking_mode=VECTOR, then the SFT switches the tracking_mode of the SFT entry to IMPRECISE and updates the tracking_info as needed for the AIDs that it currently holds as well as the new AID that it's adding to the logical SFT entry.

An operation 1304 determines if the base SFT entry is able to record an additional AID to its tracking_info field. If so, an operation 1306 adds the new agent's AID to the base SFT entry and as per operation 1314 the tracking_mode of the base SFT entry remains set to AID_ME. If the operation 1304 determines that the base SFT entry is not able to record an additional AID to its tracking_info field, an operation 1308 determines whether the extra SFT entry is able to record an additional AID to its tracking_info field. If so, an operation 1310 adds the new agent's AID to the extra SFT entry and as per operation 1314 the tracking_mode of the base SFT entry remains set to AID_ME.

If the operation 1308 determines that even the extra SFT entry is not able to record the additional AID, an operation 1312 determines if the SFT is configured to use a vector to track the agents that hold a copy of the SFT entry's cogran. If so, an operation 1316 sets the base SFT entry's tracking_mode to VECTOR, an operation 1318 sets the tracking vector bit positions in the extra SFT entry for any currently tracked agents, and an operation 1320 sets the tracking vector bit position in the extra SFT entry for the new agent. If the SFT is not configured to record the AID in a vector, an operation 1322 sets the tracking_mode of the base SFT entry to IMPRECISE, an operation 1324 updates to imprecise tracking for any currently tracked agents, and an operation 1326 adds the new agent to the imprecise tracking.

Figure 14:
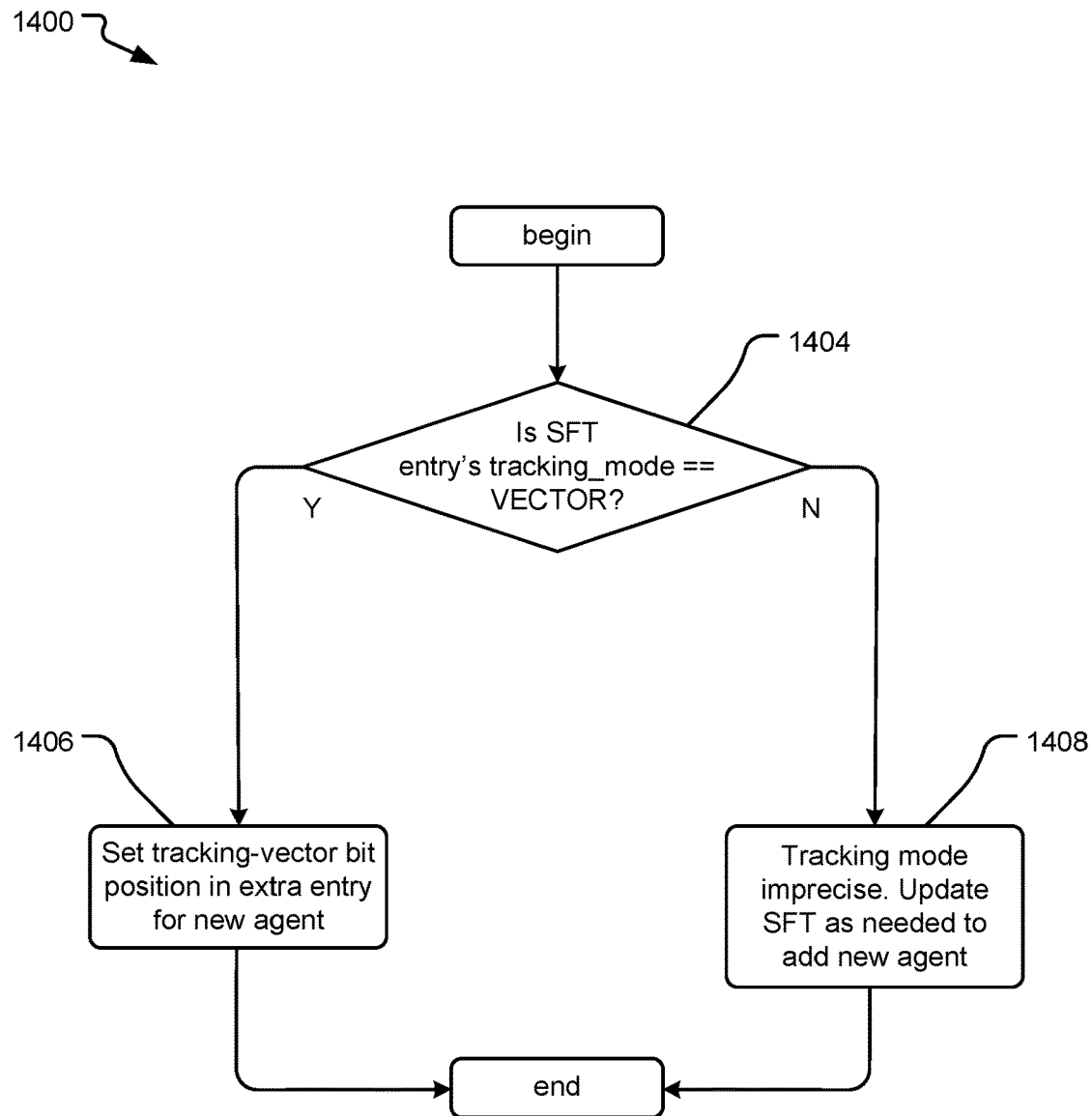
FIG. 14 illustrates example operations for a case when SFT needs to add an agent to its existing tracking for a cogran and the logical SFT entry's tracking_mode is set to either VECTOR or IMPRECISE.

FIG. 14 illustrates operations 1400 for a case when SFT needs to add an agent to its existing tracking for a cogran and the logical SFT entry's tracking_mode is set to either VECTOR or IMPRECISE. An operation 1404 determines if the SFT entry's tracking_mode is VECTOR. If so, an operation 1406 sets the tracking vector bit position in the extra SFT entry for the new agent, while the tracking_mode remains set to VECTOR. If the SFT entry's tracking_mode is not VECTOR, the tracking_mode is imprecise and an operation 1408 updates the SFT as needed to add the new agent's AID, while the tracking_mode remains set to IMPRECISE.

Figure 15:
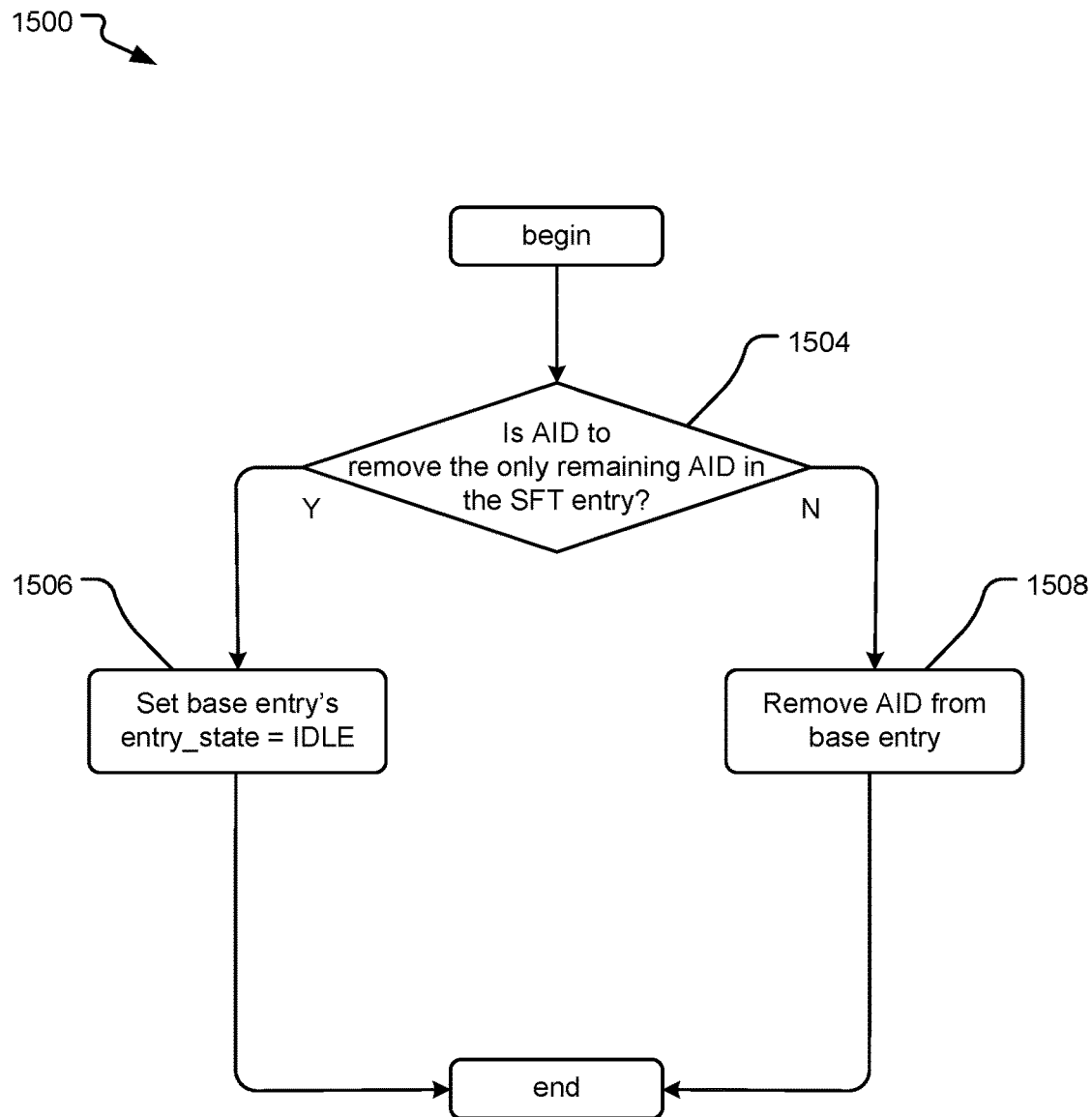
FIG. 15 illustrates example operations for a case when SFT needs to remove an agent from it for a cogran and the logical SFT entry's tracking_mode is set to AID.

FIG. 15 illustrates operations 1500 for a case when SFT needs to remove an agent from its tracking for a cogran and the logical SFT entry's tracking_mode is set to AID. Specifically, the operations 1500 remove the AID from tracking and if the logical SFT entry is no longer tracking any agents, the logical SFT entry may be de-allocated by setting the entry_state of the base SFT entry to IDLE. An operation 1504 determines if the AID corresponding to the agent to be removed is the only AID in the SFT entry. If so, an operation 1506 sets the base SFT entry's entry_state to IDLE, while the tracking_mode of the base SFT entry remains set to AID. If the AID to be removed is not the only AID in the SFT entry, an operation 1508 removes the AID from the base entry, while the tracking_mode of the base SFT entry remains set to AID.

Figure 16:
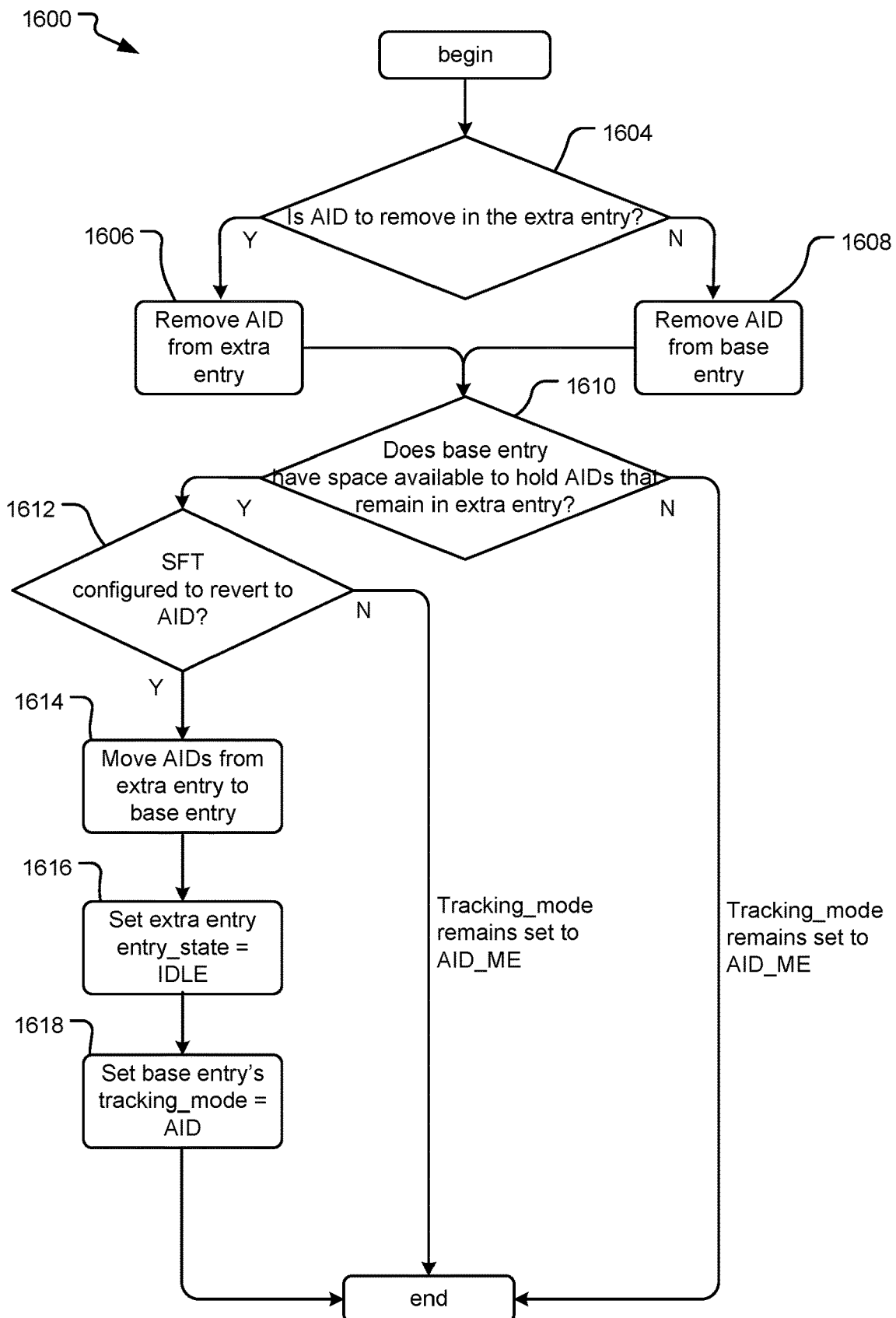
FIG. 16 illustrates example operations for a case when SFT needs to remove an agent from its existing tracking for a cogran and the logical SFT entry's tracking_mode is set to AID_ME.

FIG. 16 illustrates operations 1600 for a case when SFT needs to remove an agent from its existing tracking for a cogran and the logical SFT entry's tracking_mode is set to AID_ME. In this case, the SFT removes the AID corresponding to that agent from whichever SFT entry, either the base SFT entry or the extra SFT entry that is currently holding that agent's AID. If after the AID is removed, the number of remaining AIDs held by the logical SFT entry can fit into a single physical entry and the SFT is configured to consolidate AIDs to a single physical SFT entry, any AIDs held by the extra SFT entry are moved to the base SFT entry, the extra SFT entry's entry_state is set to IDLE, and the base SFT entry's tracking_mode is set to AID.

An operation 1604 determines if an AID is to be removed from an extra SFT entry. If so, an operation 1606 removes the AID from the extra SFT entry. If an AID is not to be removed from an extra SFT entry, an operation 1608 removes the AID from the base SFT entry. Subsequently, an operation 1610 determines if the base SFT entry has any space available to hold all the AIDs that remain in the extra SFT entry. If the base SFT entry does not have any space available to hold AIDs that remain in the extra SFT entry, the tracking_mode of the logical SFT entry remains set to AID_ME.

If the base SFT entry has any space available to hold all the AIDs that remain in the extra SFT entry, an operation 1612 further determines if the SFT is configured to revert to AID mode when possible. In response to determining that the SFT is configured to revert to AID mode, an operation 1614 moves all the AIDs from the extra SFT entry to the base SFT entry, an operation 1616 sets the extra SFT entry's entry_state to IDLE, and an operation 1618 sets the base SFT entry's tracking_mode to AID. If the SFT is not configured to revert to AID mode, the tracking_mode of the logical SFT entry remains set to AID_ME.

Figure 17:
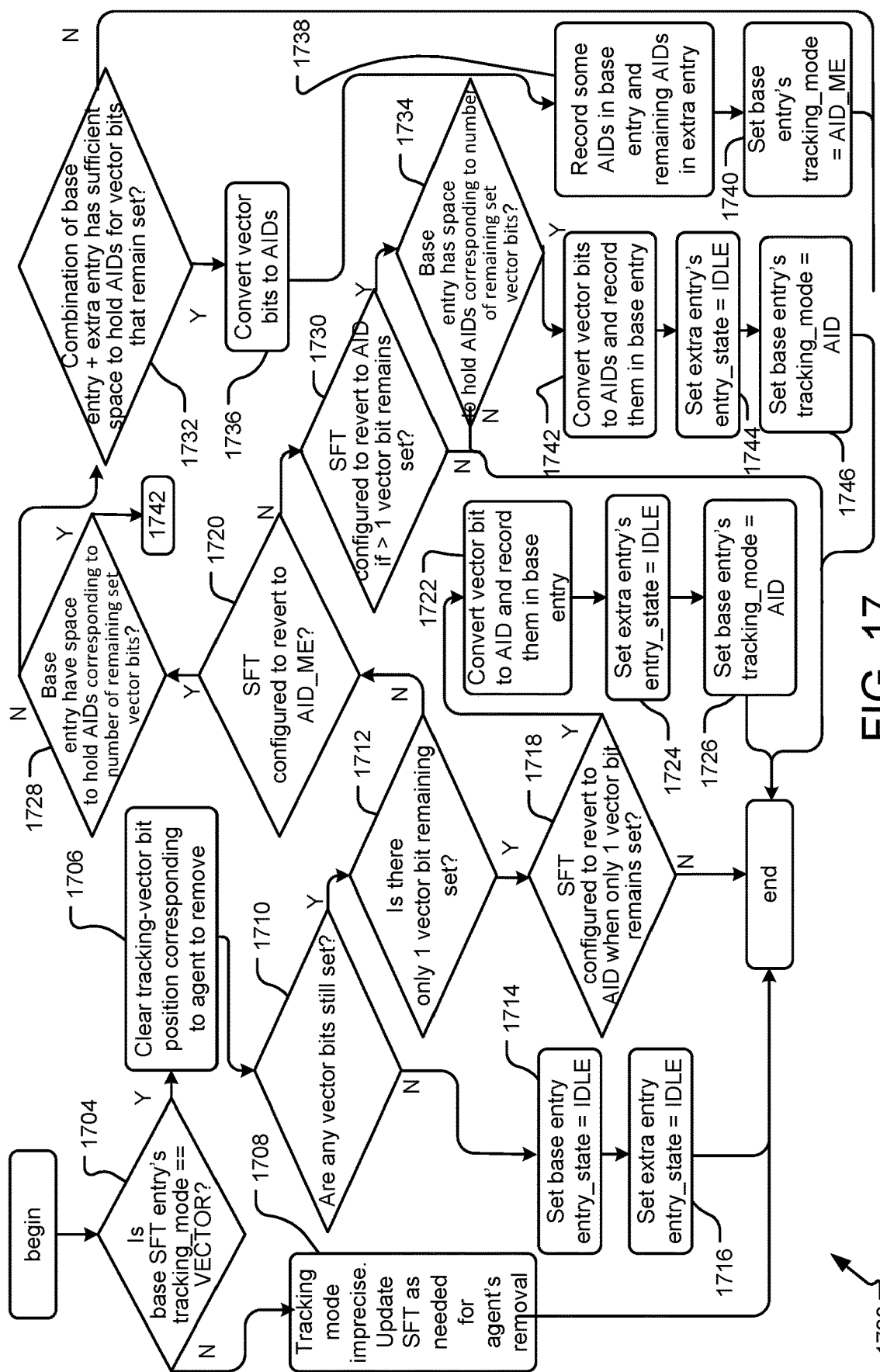
FIG. 17 illustrates example operations for a case when SFT needs to remove an agent from its existing tracking for a cogran and the logical SFT entry's tracking_mode is set to either VECTOR or IMPRECISE.

FIG. 17 illustrates operations 1700 for a case when SFT needs to remove an agent from its existing tracking for a cogran and the base SFT entry's tracking_mode is set to either VECTOR or IMPRECISE.

An operation 1704 determines if the base SFT entry's tracking_mode is set to VECTOR. If the base SFT entry's tracking_mode is not set to VECTOR, the tracking_mode of the base SFT entry is determined to be IMPRECISE and an operation 1708 updates the SFT as needed to remove the agent from its existing tracking of a cogran. If the base SFT entry's tracking_mode is set to VECTOR, an operation 1706 clears the tracking vector bit position corresponding to the agent that is to be removed. Subsequently, an operation 1710 determines if there are any vector bits in the tracking vector that are still set. If no more vector bits in the tracking vector are still set, an operation 1714 sets the base SFT entry's entry_state to IDLE and an operation 1716 sets the extra SFT entry's entry_state to IDLE and the entry is de-allocated.

If there are any vector bits in the tracking vector that are still set, an operation 1712 determines if there is only one vector bit remaining set in the tracking vector. If so, an operation 1718 further determines if the SFT is configured to revert its tracking_mode to AID when only one vector bit remains set in the tracking vector. If the SFT is configured to revert its tracking_mode to AID when only one vector bit remains set in the tracking vector, an operation 1722 converts the vector bit to its equivalent AID and records the AID along with its VLD bit to the base SFT entry's tracking_info field. An operation 1724 sets the extra SFT entry's entry_state to IDLE and operation 1726 sets the base SFT entry's tracking_mode to AID.

If the operation 1712 determines that there are more than one vector bits remaining set in the tracking vector, an operation 1720 determines if the SFT is configured to revert its tracking_mode to AID_ME. If the SFT is configured to revert its tracking_mode to AID_ME, an operation 1728 further determines if the base SFT entry has enough space to hold a number of AIDs corresponding to the number of vector bits that remain set. If the base SFT entry has enough space to hold AIDs corresponding to the vector bits that remain set, an operation 1742 converts the vector bits to their equivalent AIDs, records the AIDs in the tracking_info field of the base SFT entry, and sets their corresponding VLD bits. An operation 1744 sets the extra SFT entry's entry_state to IDLE and an operation 1746 sets the base SFT entry's tracking_mode to AID. If the operation 1728 determines that the base SFT entry does not have enough space to hold AIDs corresponding to the vector bits that remain set, an operation 1732 determines if a combination of base SFT entry and the extra SFT entry has enough space to hold a number of AIDs corresponding to the number of vector bits that remain set. If the combination of base SFT entry and the extra SFT entry has enough space to hold AIDs corresponding to the vector bits that remain set, an operation 1736 converts the vector bits of the tracking vector to their equivalent AIDs, an operation 1738 records some of the AIDs in the base SFT entry and records the remaining AIDs in the extra SFT entry and sets their corresponding VLD bits, and an operation 1740 sets the base SFT entry's tracking_mode to AID_ME.

If the operation 1720 determines that the SFT is not configured to revert to AID_ME, an operation 1730 determines if the SFT is configured to revert its tracking_mode to AID mode if more than one vector bit remains set in the tracking vector. If so, an operation 1734 further determines if the base SFT entry has enough space to hold a number of AIDs corresponding to the number of vector bits that remain set. If so, the control transfers to operation 1742, which converts the vector bits to their equivalent AIDs, records the AIDs in the tracking_info field of the base SFT entry, and sets their corresponding VLD bits.

The cache coherence system disclosed herein uses logical SFT entry structure to dynamically use an extra SFT entry to store a portion of tracking vector or to store additional AIDs and to revert to a single physical entry any time the number of agents being tracked can fit into a single SFT entry. As a result, as agents communicate to the cache coherence system that they are evicting a cogran from their private cache and as a result when the extra SFT entries are no longer needed, the SFT de-allocates the extra SFT entries. This results in more efficient use of the SFT entries as extra SFT entries are de-allocated when they are no longer needed to hold tracking information for the current cograns.

Furthermore, the implementation disclosed herein that allow for more than one extra SFT entries to be dynamically added and/or subtracted which enables reducing the size of a physical SFT entries to a smaller size, for example to track only a single agent. Implementations having higher number of smaller physical SFT entries allows the SFT to be better able to dynamically reconfigure itself to have a lot of precise tracking for the cograns that need it and to make that storage space available to track a higher number of cograns when there is less sharing of cograns is going on.

Figure 18:
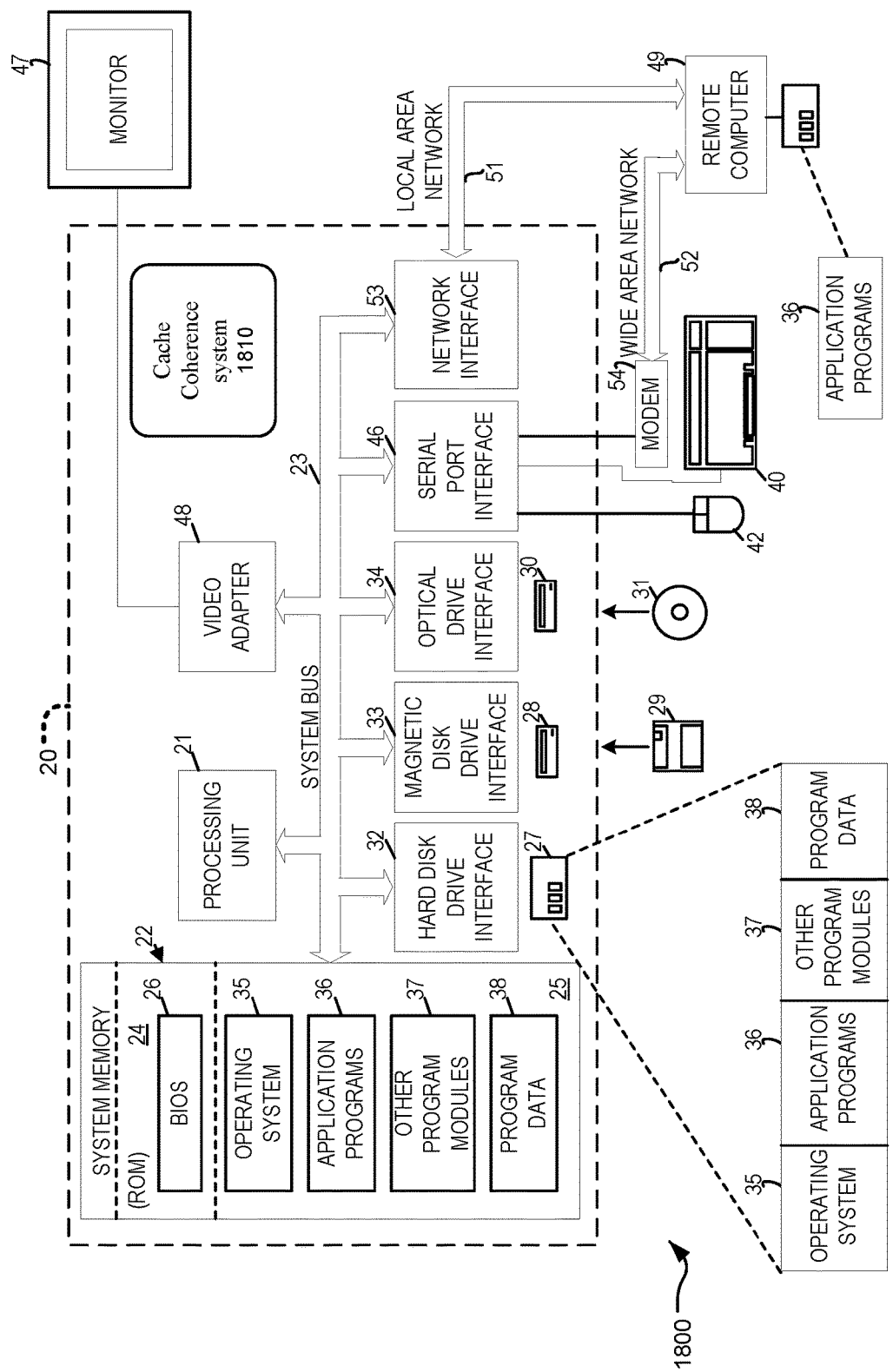
FIG. 18 illustrates an example system that may be useful in implementing the high latency query optimization system disclosed herein.

FIG. 18 illustrates an example system 1800 that may be useful in implementing the high latency query optimization system disclosed herein. The example hardware and operating environment of FIG. 18 for implementing the described technology includes a computing device, such as a general-purpose computing device in the form of a computer 20, a mobile telephone, a personal data assistant (PDA), a tablet, smart watch, gaming remote, or other type of computing device. In the implementation of FIG. 18, for example, the computer 20 includes a processing unit 21, a system memory 22, and a system bus 23 that operatively couples various system components, including the system memory 22 to the processing unit 21. There may be only one or there may be more than one processing units 21, such that the processor of a computer 20 comprises a single central-processing unit (CPU), or a plurality of processing units, commonly referred to as a parallel processing environment. The computer 20 may be a conventional computer, a distributed computer, or any other type of computer; the implementations are not so limited.

The system bus 23 may be any of several types of bus structures, including a memory bus or memory controller, a peripheral bus, a switched fabric, point-to-point connections, and a local bus using any of a variety of bus architectures. The system memory 22 may also be referred to as simply the memory and includes read-only memory (ROM) 24 and random-access memory (RAM) 25. A basic input/output system (BIOS) 26, contains the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The computer 20 may be used to implement a high latency query optimization system disclosed herein. In one implementation, a frequency unwrapping module, including instructions to unwrap frequencies based at least in part on the sampled reflected modulations signals, may be stored in memory of the computer 20, such as the read-only memory (ROM) 24 and random-access memory (RAM) 25.

Furthermore, instructions stored on the memory of the computer 20 may be used to generate a transformation matrix using one or more operations disclosed in FIGS. 5-17. Similarly, instructions stored on the memory of the computer 20 may also be used to implement one or more operations of FIGS. 5-17. The memory of the computer 20 may also one or more instructions to implement the high latency query optimization system disclosed herein.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide non-volatile storage of computer-readable instructions, data structures, program modules and other data for the computer 20. It should be appreciated by those skilled in the art that any type of tangible computer-readable media may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may generate reminders on the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus 23, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device, or other common network node, and typically includes many or all of the elements described above relative to the computer 20. The logical connections depicted in FIG. 18 include a local-area network (LAN) 51 and a wide-area network (WAN) 52. Such networking environments are commonplace in office networks, enterprise-wide computer networks, intranets, and the Internet, which are all types of networks.

When used in a LAN-networking environment, the computer 20 is connected to the local area network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of communications devices for establishing a communications link between the computers may be used.

In an example implementation, software, or firmware instructions for the cache coherence system 1810 may be stored in system memory 22 and/or storage devices 29 or 31 and processed by the processing unit 21. high latency query optimization system operations and data may be stored in system memory 22 and/or storage devices 29 or 31 as persistent data-stores.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments of high latency query optimization system may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner, or syntax, for instructing a computer to perform a certain function. The instructions may be implemented using any suitable high-level, low-level, object-oriented, visual, compiled and/or interpreted programming language.

The high latency query optimization system disclosed herein may include a variety of tangible computer-readable storage media and intangible computer-readable communication signals. Tangible computer-readable storage can be embodied by any available media that can be accessed by the high latency query optimization system disclosed herein and includes both volatile and nonvolatile storage media, removable and non-removable storage media. Tangible computer-readable storage media excludes intangible and transitory communications signals and includes volatile and nonvolatile, removable, and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the high latency query optimization system disclosed herein. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals moving through wired media such as a wired network or direct-wired connection, and signals moving through wireless media such as acoustic, RF, infrared and other wireless media.

A system disclosed herein includes a memory, one or more processor units and a cache coherence system stored in the memory and executable by the one or more processor units, the cache coherence system encoding computer-executable instructions on the memory for executing on the one or more processor units a computer process, the computer process including selecting a physical SFT entry to be victimized, the physical SFT entry being one of a base SFT entry and an extra SFT entry of a logical SFT entry in a snoop filter (SFT) and consolidating the base SFT entry and the extra SFT entry into one physical entry.

A method disclosed herein includes selecting a physical SFT entry to be victimized, the physical SFT entry being one of a base SFT entry and an extra SFT entry of a logical SFT entry in a snoop filter (SFT) and consolidating the base SFT entry and the extra SFT entry into one physical entry.

An implementation of the system disclosed herein includes One or more physically manufactured computer-readable storage media, encoding computer-executable instructions for executing on a computer system a computer process, the computer process including selecting a physical SFT entry to be victimized, the physical SFT entry being one of a base SFT entry and an extra SFT entry of a logical SFT entry in a snoop filter (SFT) and consolidating the base SFT entry and the extra SFT entry into one physical entry.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A method comprising:
   selecting a physical SFT entry to be victimized, the physical SFT entry being one of a base SFT entry and an extra SFT entry of a logical SFT entry in a snoop filter (SFT); and
   consolidating the base SFT entry and the extra SFT entry into one physical entry.

2. The method of claim 1, wherein selecting the physical SFT entry to be victimized further comprising:
   receiving a notice of a coherence granule (cogran) being evicted from a cache of an evicting agent; and
   determining that the one physical SFT entry has enough capacity to hold AIDs of all agents that remain tracked by the logical SFT entry after the cogran being evicted from the cache of the evicting agent.

3. The method of claim 2, wherein consolidating the base SFT entry and the extra SFT entry into one physical entry further comprising:
   determining that an SFT entry to be updated due to the evicting agent is in a VECTOR tracking_mode;
   in response to receiving the notice of the cogran being evicted, removing a bit associated with the evicting agent from the tracking vector stored in the logical SFT entry;
   determining a number of agents being tracked by the logical SFT entry after removal of the bit associated with the evicting agent from the tracking vector;
   comparing the number of agents being tracked by the logical SFT entry with a number of agents that can be tracked by a single physical SFT entry; and
   in response to determining that the number of agents being tracked by the logical SFT entry is at or below the number of agents that can be tracked by a single physical SFT entry, performing de-allocation of the extra SFT entry.

4. The method of claim 3, wherein performing de-allocation of the extra SFT entry further comprising:
   determining the number of vector bits that are set in the tracking vector of the logical SFT entry; and
   in response to determining that the number of tracking bits in the tracking vector of the logical SFT entry is zero, setting the entry_state of the extra SFT entry to IDLE.

5. The method of claim 3, wherein performing de-allocation of the extra SFT entry further comprising:
   determining a number of vector bits that are set in the tracking vector of the logical SFT entry; and
   in response to determining that the number of tracking bits in the tracking vector of the logical SFT entry that are set is one and that the SFT is configured to revert to an AID mode converting the tracking vector bit associated with the remaining agent caching the cogran to a remaining agent AID and recording the remaining agent AID to the base SFT entry.

6. The method of claim 1, further comprising in response to determining that a number of tracking bits in the tracking vector of the logical SFT entry is one and that the SFT is configured to revert to an AID mode, setting an entry_state of the extra SFT entry to IDLE and setting an entry_state of the base SFT entry to AID.

7. The method of claim 1, wherein consolidating the base SFT entry and the extra SFT entry into one physical entry further comprising:
   determining that the one physical entry does not have enough capacity to hold AIDs of all agents that remain tracked by the logical SFT entry; and
   in response to determining that the one physical entry does not have enough capacity to hold AIDs of all agents that remain tracked by the logical SFT entry, changing the tracking mode of the logical SFT entry to IMPRECISE.

8. The method of claim 1, further comprising setting the entry_state of the extra SFT entry to SEARCHABLE.

9. One or more physically manufactured computer-readable storage media, encoding computer-executable instructions for executing on a computer system a computer process, the computer process comprising:
   selecting a physical SFT entry to be victimized, the physical SFT entry being one of a base SFT entry and an extra SFT entry of a logical SFT entry in a snoop filter (SFT); and
   consolidating the base SFT entry and the extra SFT entry into one physical entry.

10. The one or more physically manufactured computer-readable storage media of manufacture of claim 9, wherein the computer process further comprising:
    receiving a notice of a coherence granule (cogran) being evicted from a cache of an evicting agent; and
    determining that the one physical SFT entry has enough capacity to hold AIDs of all agents that remain tracked by the logical SFT entry after the cogran being evicted from the cache of the evicting agent.

11. The one or more physically manufactured computer-readable storage media of manufacture of claim 10, wherein the computer process further comprising:
    determining that an SFT entry to be updated due to the evicting agent is in a VECTOR tracking_mode;
    in response to receiving the notice of the cogran being evicted, removing a bit associated with the evicting agent from the tracking vector stored in the logical SFT entry;
    determining a number of agents being tracked by the logical SFT entry after removal of the bit associated with the evicting agent from the tracking vector;
    comparing the number of agents being tracked by the logical SFT entry with a number of agents that can be tracked by a single physical SFT entry; and
    in response to determining that the number of agents being tracked by the logical SFT entry is at or below the number of agents that can be tracked by a single physical SFT entry, performing de-allocation of the extra SFT entry.

12. The one or more physically manufactured computer-readable storage media of manufacture of claim 11, wherein the computer process further comprising:
    determining the number of vector bits that are set in the tracking vector of the logical SFT entry; and
    in response to determining that the number of tracking bits in the tracking vector of the logical SFT entry is zero, setting the entry_state of the extra SFT entry to IDLE.

13. The one or more physically manufactured computer-readable storage media of manufacture of claim 11, wherein the computer process further comprising:
    determining a number of vector bits that are set in the tracking vector of the logical SFT entry; and
    in response to determining that the number of tracking bits in the tracking vector of the logical SFT entry that are set is one and that the SFT is configured to revert to an AID mode converting the tracking vector bit associated with the remaining agent caching the cogran to a remaining agent AID and recording the remaining agent AID to the base SFT entry.

14. The one or more physically manufactured computer-readable storage media of manufacture of claim 9, wherein the computer process further comprising in response to determining that a number of tracking bits in the tracking vector of the logical SFT entry is one and that the SFT is configured to revert to an AID mode, setting an entry_state of the extra SFT entry to IDLE and setting an entry_state of the base SFT entry to AID.

15. The one or more physically manufactured computer-readable storage media of manufacture of claim 9, wherein consolidating the base SFT entry and the extra SFT entry into one physical entry further comprising:
    determining that the one physical entry does not have enough capacity to hold AIDs of all agents that remain tracked by the logical SFT entry; and
    in response to determining that the one physical entry does not have enough capacity to hold AIDs of all agents that remain tracked by the logical SFT entry, changing the tracking mode of the logical SFT entry to IMPRECISE.

16. A system comprising:
    memory;
    one or more processor units; and
    a cache coherence system stored in the memory and executable by the one or more processor units, the cache coherence system encoding computer-executable instructions on the memory for executing on the one or more processor units a computer process, the computer process comprising:
    selecting a physical SFT entry to be victimized, the physical SFT entry being one of a base SFT entry and an extra SFT entry of a logical SFT entry in a snoop filter (SFT); and
    consolidating the base SFT entry and the extra SFT entry into one physical entry.

17. The system of claim 16, wherein the computer process further comprising:
    receiving a notice of a coherence granule (cogran) being evicted from a cache of an evicting agent; and
    determining that the one physical SFT entry has enough capacity to hold AIDs of all agents that remain tracked by the logical SFT entry after the cogran being evicted from the cache of the evicting agent.

18. The system of claim 17, wherein the computer process further comprising:
- determining that an SFT entry to be updated due to the evicting agent is in a VECTOR tracking_mode;
- in response to receiving the notice of the cogran being evicted, removing a bit associated with the evicting agent from the tracking vector stored in the logical SFT entry;
- determining a number of agents being tracked by the logical SFT entry after removal of the bit associated with the evicting agent from the tracking vector;
- comparing the number of agents being tracked by the logical SFT entry with a number of agents that can be tracked by a single physical SFT entry; and
- in response to determining that the number of agents being tracked by the logical SFT entry is at or below the number of agents that can be tracked by a single physical SFT entry, performing de-allocation of the extra SFT entry.

19. The system of claim 18, wherein the computer process further comprising:
- determining the number of vector bits that are set in the tracking vector of the logical SFT entry; and
- in response to determining that the number of tracking bits in the tracking vector of the logical SFT entry is zero, setting the entry_state of the extra SFT entry to IDLE.

20. The system of claim 18, wherein the computer process further comprising:
- determining a number of vector bits that are set in the tracking vector of the logical SFT entry; and
- in response to determining that the number of tracking bits in the tracking vector of the logical SFT entry that are set is one and that the SFT is configured to revert to an AID mode converting the tracking vector bit associated with the remaining agent caching the cogran to a remaining agent AID and recording the remaining agent AID to the base SFT entry.

* * * * *